United States Patent
Tour et al.

(10) Patent No.: US 7,273,023 B2
(45) Date of Patent: Sep. 25, 2007

(54) STEAM ENHANCED DOUBLE PISTON CYCLE ENGINE

(75) Inventors: Benjamin H. Tour, San Diego, CA (US); Oded Tour, San Diego, CA (US)

(73) Assignee: Tour Engine, Inc., San Diego, CA (US)

( * ) Notice: Subject to any disclaimer, the term of this patent is extended or adjusted under 35 U.S.C. 154(b) by 0 days.

(21) Appl. No.: 11/406,160

(22) Filed: Apr. 18, 2006

(65) Prior Publication Data

US 2007/0039323 A1    Feb. 22, 2007

Related U.S. Application Data

(60) Provisional application No. 11/371,827, filed on Mar. 9, 2006, provisional application No. 60/661,195, filed on Mar. 11, 2005, provisional application No. 60/672,421, filed on Apr. 18, 2005.

(51) Int. Cl.
*F02B 25/00* (2006.01)
(52) U.S. Cl. .................... 123/71 R; 60/597; 60/620
(58) Field of Classification Search ............... 60/597, 60/620; 123/52.1–59.7, 60.1, 61 R–63, 67, 123/68, 69 R–72, 662, 663
See application file for complete search history.

(56) References Cited

U.S. PATENT DOCUMENTS

| | | | |
|---|---|---|---|
| 1,369,511 A * | 2/1921 | Wiesner ...................... | 60/620 |
| 1,372,216 A | 3/1921 | Casaday | |
| 1,633,921 A * | 6/1927 | Burtnett .................... | 123/70 R |
| 3,143,282 A * | 8/1964 | King et al. ............... | 123/46 R |
| 3,805,752 A | 4/1974 | Cataldo | |
| 3,808,818 A | 5/1974 | Cataldo | |
| 3,880,126 A | 4/1975 | Thurston et al. | |
| 3,959,974 A | 6/1976 | Thomas | |
| 3,991,721 A | 11/1976 | Hurd | |
| 4,040,400 A * | 8/1977 | Kiener ....................... | 123/68 |
| 4,157,080 A | 6/1979 | Hill | |
| 4,159,700 A | 7/1979 | McCrum | |
| 4,202,300 A | 5/1980 | Skay | |
| 4,565,167 A | 1/1986 | Bryant | |
| 4,787,343 A | 11/1988 | Tuckey | |
| 5,072,589 A | 12/1991 | Schmitz | |
| 5,265,564 A | 11/1993 | Dullaway | |
| 5,431,130 A | 7/1995 | Brackett | |
| 5,546,897 A | 8/1996 | Brackett | |
| 5,623,894 A | 4/1997 | Clarke | |
| 5,857,436 A | 1/1999 | Chen | |
| 6,095,100 A | 8/2000 | Hughes | |
| 6,318,310 B1 | 11/2001 | Clarke | |
| 6,340,004 B1 | 1/2002 | Patton | |
| 6,553,977 B2 | 4/2003 | Schmitz | |
| 6,789,514 B2 | 9/2004 | Suh et al. | |

(Continued)

*Primary Examiner*—Noah P. Kamen
(74) *Attorney, Agent, or Firm*—Morrison & Foerster LLP

(57) ABSTRACT

A steam enhanced dual piston cycle engine utilizes a unique dual piston apparatus that includes: a first cylinder housing a first piston therein, wherein the first piston performs only intake and compression strokes; a second cylinder housing an inner power piston that forms an inner internal chamber of the second cylinder, and either a ring-shaped outer power piston surrounding the inner power piston, wherein the outer power piston forms an outer internal chamber of the second cylinder and is configured to convert engine heat into additional work, and/or an outer boiler which is configured to produce steam to be converted into additional work.

26 Claims, 23 Drawing Sheets

U.S. PATENT DOCUMENTS

| | | |
|---|---|---|
| 6,796,127 B2 | 9/2004 | Helm |
| 6,880,501 B2 | 4/2005 | Suh et al. |
| 6,918,358 B2 | 7/2005 | Hu |
| 2003/0014971 A1 | 1/2003 | Scuderi |
| 2003/0015171 A1 | 1/2003 | Scuderi |
| 2003/0192489 A1 | 10/2003 | Singh |
| 2004/0016234 A1 | 1/2004 | Chomiak |
| 2005/0076863 A1 | 4/2005 | Baba et al. |

* cited by examiner

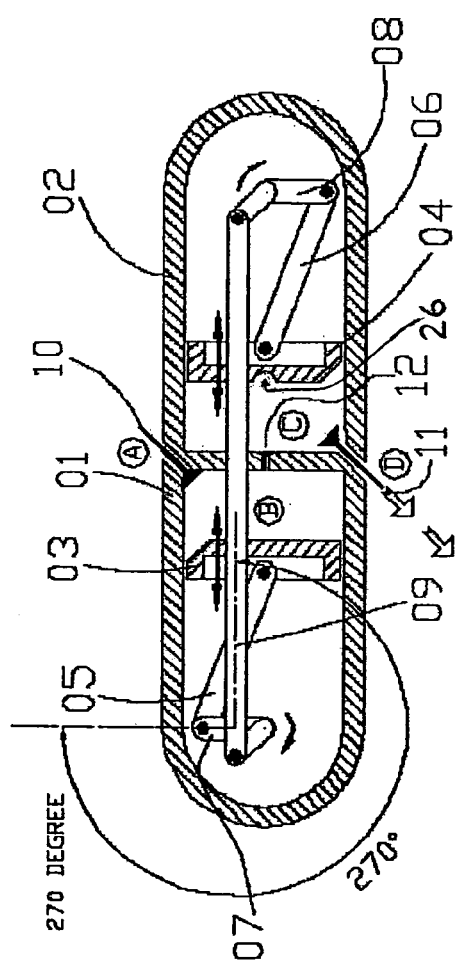
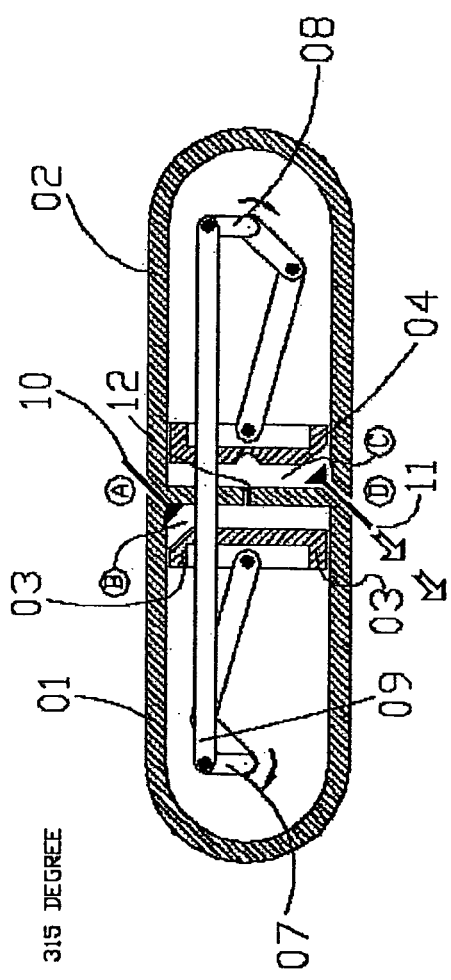

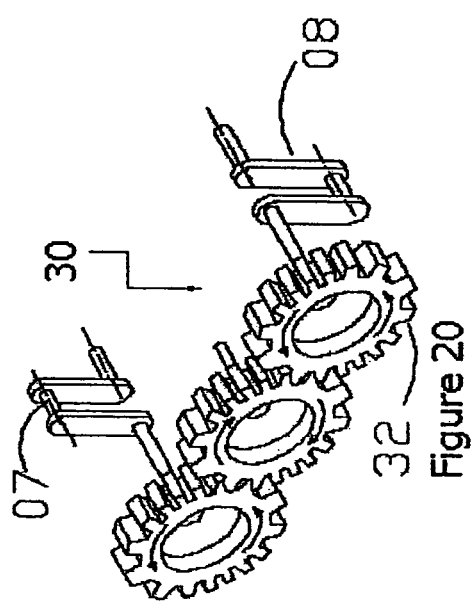
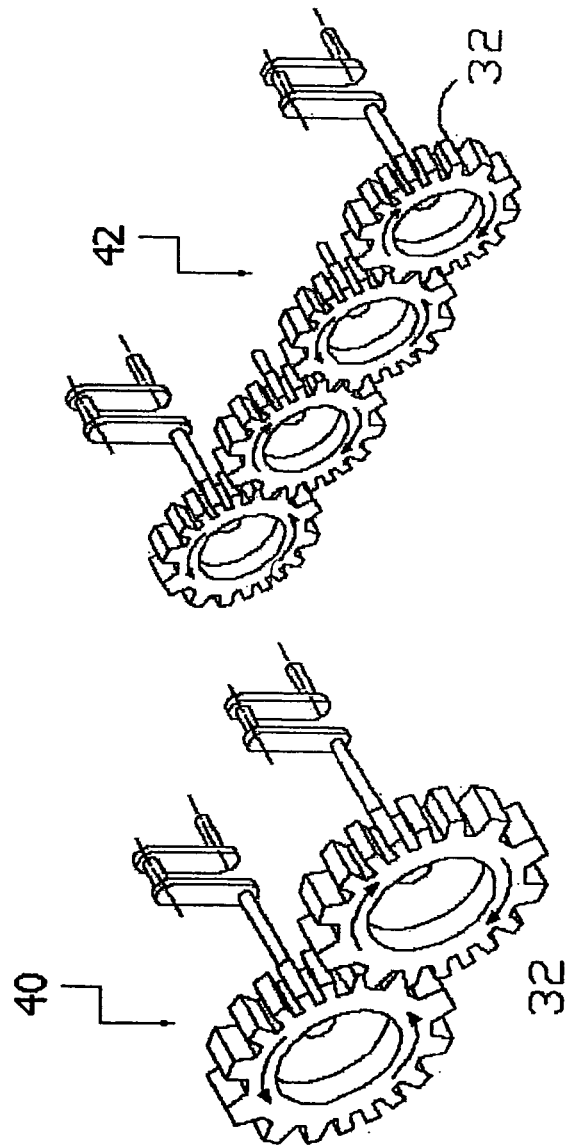
Figure 20
Figure 21

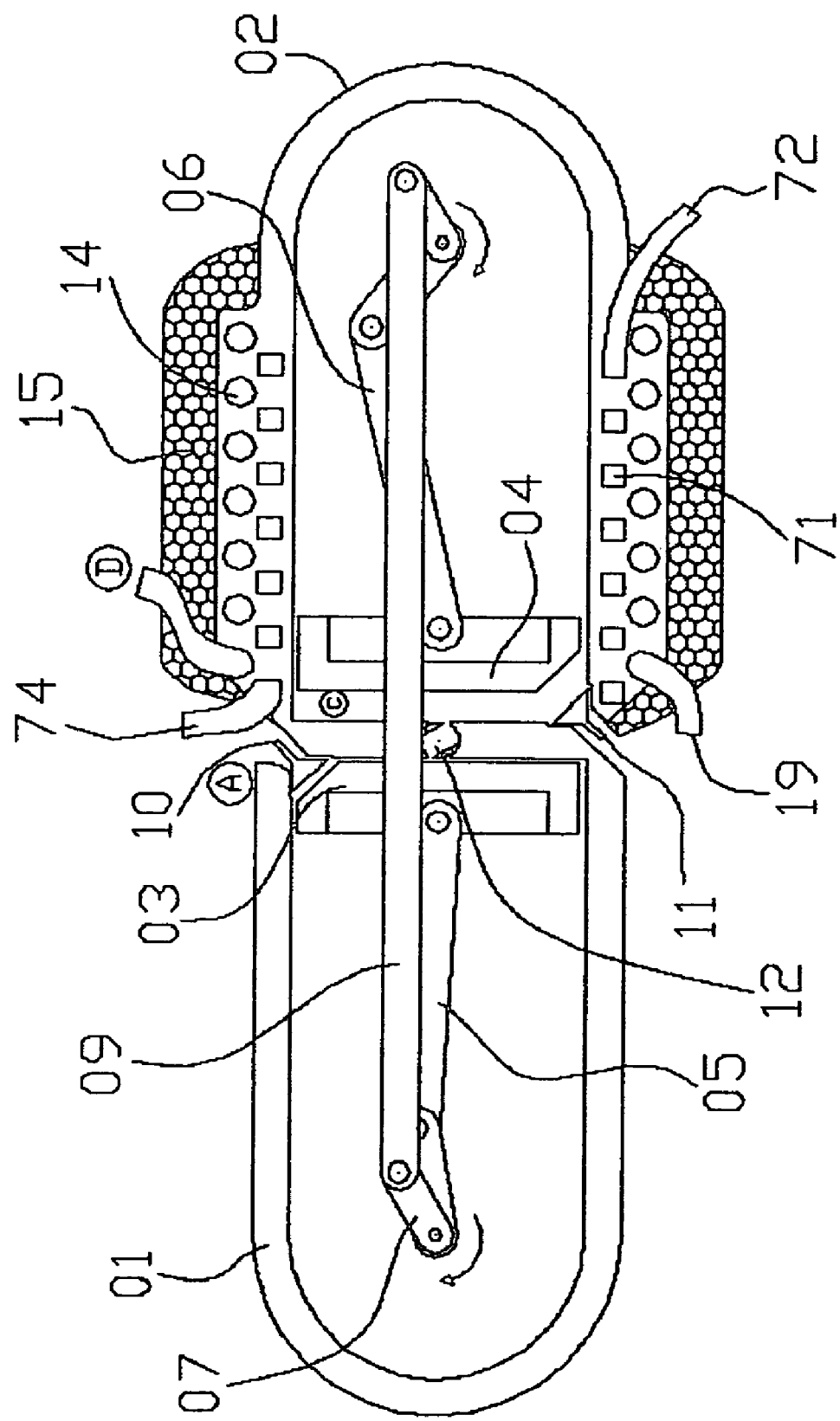

STEAM ENHANCED DOUBLE PISTON CYCLE ENGINE

RELATED APPLICATIONS

The present application is a continuation-in-part application of a commonly owned U.S. patent application entitled "DOUBLE PISTON CYCLE ENGINE (DPCE)," U.S. application Ser. No. 11/371,827, filed on Mar. 9, 2006, the entirety of which is incorporated by reference herein, and which claims the benefit of priority under 35 U.S.C. § 119(e) to U.S. provisional application Ser. No. 60/661,195 entitled "DOUBLE PISTON CYCLE ENGINE (DPCE)," filed on Mar. 11, 2005, the entirety of which is incorporated by reference herein. The present application also claims the benefit of priority under 35 U.S.C. § 119(e) to U.S. provisional application Ser. No. 60/672,421 entitled "STEAM ENHANCED DOUBLE PISTON CYCLE ENGINE (SE-DPCE)," filed on Apr. 18, 2005, the entirety of which is incorporated by reference herein.

BACKGROUND OF THE INVENTION

1. Field of the Invention

The present invention relates generally to internal combustion engines and, more specifically, it relates to a steam enhanced double piston cycle engine (SE-DPCE) that is more efficient than conventional combustion engines.

2. Description of the Related Art

It can be appreciated that internal combustion engines are ubiquitous today and have been in use for over 100 years. Typically, an internal combustion engine includes one or more cylinders. Each cylinder includes a single piston that performs four strokes, commonly referred to as the intake, compression, combustion/power, and exhaust strokes, which together form a complete cycle of conventional pistons.

The main problem with a conventional internal combustion engine is low fuel efficiency. It is estimated that more than one half of the potential fuel thermal energy created by conventional engines dissipates through the engine structure without adding any useful mechanical work. A major reason for this thermal waste is the essential cooling requirements of conventional engines. The cooling system (e.g., radiator) alone dissipates heat at a greater rate and amount than the total heat actually transformed into useful work. Another problem with conventional internal combustion engines is their inability to increase efficiencies while using heat regeneration or recycling methods to provide higher combustion temperatures.

Another reason why conventional engines suffer from efficiency problems is that the high-temperature in the cylinder during the intake and compression strokes makes the piston work harder and, hence, less efficient during these strokes.

Another disadvantage associated with existing internal combustion engines is their inability to further increase combustion temperatures and compression ratios; although raising chamber temperatures during the power stroke and increasing compression ratios would improve efficiencies.

Another problem with conventional engines is their incomplete chemical combustion process causing harmful exhaust emissions.

While these devices may be suitable for the particular purpose to which they address, they are not as efficient as the proposed SE-DPCE that utilizes temperature differentiated dual cylinders that divide the conventional four strokes of a piston into two low temperature strokes (intake and compression) and two high temperature strokes (power and exhaust), performed by each of the respective dual pistons, while further utilizing the heat generated by the high temperature strokes to generate steam, which is used to convert additional thermal energy to mechanical energy.

Although others have previously disclosed dual-piston combustion engine configurations, none provide the substantial efficiency and performance improvements of the present invention. For example, U.S. Pat. No. 1,372,216 to Casaday discloses a dual piston combustion engine in which cylinders and pistons are arranged in respective pairs. The piston of the firing cylinder moves in advance of the piston of the compression cylinder. U.S. Pat. No. 3,880,126 to Thurston et al. discloses a two-stroke cycle split cylinder internal combustion engine. The piston of the induction cylinder moves somewhat less than one-half stroke in advance of the piston of the power cylinder. The induction cylinder compresses a charge, and transfers the charge to the power cylinder where it is mixed with a residual charge of burned products from the previous cycle, and further compressed before igniting. U.S. Pat. Application No. 2003/0015171 A1 to Scuderi discloses a four-stroke cycle internal combustion engine. A power piston within a first cylinder is connected to a crankshaft and performs power and exhaust strokes of the four-stroke cycle. A compression piston within a second cylinder is also connected to the crankshaft and performs the intake and compression strokes of the same four-stroke cycle during the same rotation of the crankshaft. The power piston of the first cylinder moves in advance of the compression piston of the second cylinder. U.S. Pat. No. 6,880,501 to Suh et al. discloses an internal combustion engine that has a pair of cylinders, each cylinder containing a piston connected to a crankshaft. One cylinder is adapted for intake and compression strokes. The other cylinder is adapted for power and exhaust strokes. U.S. Pat. No. 5,546,897 to Brackett discloses a multi-cylinder reciprocating piston internal combustion engine that can perform a two, four, or diesel engine power cycle.

However, these references fail to disclose how to differentiate cylinder temperatures to effectively isolate the firing (power) cylinders from the compression cylinders and from the surrounding environment. The references further fail to disclose how to minimize mutual temperature influence between the cylinders and the surrounding environment. In addition, the references fail to disclose engine improvements that further raise the temperature of the firing cylinder and lower the temperature of the compression cylinder beyond that of conventional combustion engine cylinders to enhance engine efficiency and performance. Specifically, minimizing temperature of the compression cylinder allows for a reduced compression work investment, while increasing temperature in the power cylinder allows for increased heat regeneration. In addition, the separate cylinders disclosed in these references are all connected by a transfer valve or intermediate passageway of some sort that yields a volume of "dead space" between cylinders, permitting gases to accumulate in between cylinders and further degrading the efficiency of the engine. Additionally, none of these prior art references discussed above teach an opposed or "V" cylinder and crankshaft configuration that minimizes dead space between cylinders while isolating the cylinders to maintain an improved temperature differential between the cylinders. Finally, none of these prior art references disclose splitting the combustion/power chamber into two separate chambers and utilizing steam energy in an outer chamber for additional engine efficiency and work. Additionally, none of the prior art references disclose or suggest a secondary system, enveloping the primary combustion chamber, that converts the excessive thermal energy produced by the hot chamber into additional kinetic energy.

U.S. Pat. No. 5,623,894 to Clarke discloses a dual compression and dual expansion internal combustion engine. An internal housing containing two pistons moves within an external housing forming separate chambers for compression and expansion. However, Clarke contains a single chamber that executes all of the engine strokes preventing isolation and/or improved temperature differentiation of cylinders such as those disclosed in the present invention. Clarke also fails to disclose forming a separate chamber for utilizing additional energy (e.g., heated air or steam) generated by excess engine heat.

U.S. Pat. No. 3,959,974 to Thomas discloses a combustion engine comprising a combustion cylinder formed in part of material which can withstand high temperatures in a ringless section containing a power piston and connected to a ringed section maintaining a relatively low temperature containing another piston. However, elevated temperatures in the entire Thomas engine reside not only throughout the combustion and exhaust strokes, but also during part of the compression stroke. Further, Thomas fails to disclose a method of isolating the engine cylinders in an opposed or "V" configuration to permit improved temperature differentiation and discloses an engine containing substantial dead space in the air intake port connecting the cylinders. Finally, Thomas fails to disclose forming a separate chamber for utilizing additional energy (e.g., heated air or steam) generated by excess engine heat.

In these respects, the SE-DPCE according to the present invention substantially departs from the conventional concepts and designs of the prior art, and in doing so provides a dramatically improved internal combustion engine that is more efficient than conventional internal combustion engines.

SUMMARY OF THE INVENTION

In view of the foregoing disadvantages inherent in the known types of internal combustion engine now present in the prior art, the newly proposed invention provides a SE-DPCE combustion engine utilizing temperature differentiated cylinders that converts fuel into energy or work in a more efficient manner than conventional combustion engines, as well as converting excessive engine heat into additional useful work.

In one embodiment of the invention, a steam enhanced dual piston cycle engine (SE-DPCE) utilizes temperature differentiated cylinders that convert fuel into energy or work in a more efficient manner than conventional combustion engines, as described in U.S. provisional application Ser. No. 60/661,195, the entirety of which is incorporated by reference herein, and further enhances the DPCE apparatus by utilizing engine heat to create and convert steam energy into additional useful engine work.

In one embodiment of the present invention, the engine includes a first cylinder coupled to a second cylinder, a first piston positioned within the first cylinder and configured to perform intake and compression strokes, and a second piston positioned within the second cylinder and configured to perform power and exhaust strokes. Alternatively, the first and second cylinders can be considered as a single cylinder having two separate chambers coupled to each other within the single cylinder, wherein the first piston resides in the first chamber and the second piston resides in the second chamber.

In a further embodiment, the engine further includes an intake valve coupled to the first cylinder, an exhaust valve coupled to the second cylinder and an interstage valve that couples an internal chamber of the first cylinder to an internal chamber of the second cylinder.

In a further embodiment, the engine includes two piston connecting rods, a compression crankshaft, a power crankshaft and two crankshaft connecting rods. The connecting rods connect respective pistons to their respective crankshafts. The compression crankshaft converts rotational movement into reciprocating movement of the first piston. The power crankshaft converts second piston reciprocating movement into engine rotational output movement. The crankshaft connecting rods transfer the power crankshaft rotation into compression crankshaft rotation.

In a further embodiment, the engine includes a fuel injector, water/steam inlet valves and water/steam exhaust valve. The first compression cylinder houses the compression piston, the intake valve, and part of the interstage valve. The second power cylinder comprises two separate cylinders: an outer cylinder and an inner cylinder. Within the outer and inner cylinder resides a dual piston: a disc shaped inner piston and a ring shaped outer piston. In addition, the second power cylinder includes an exhaust valve, an outer exhaust shell (wrapped exhaust pipe), a heat isolation layer, part of the interstage valve, fuel injector, spark plug, steam/water valve (and/or injectors), and steam/water/air exhaust valve. The first compression piston performs the intake and the compression engine strokes. The inner power piston performs the fuel combustion power stroke and the exhaust (burned gaseous) relief stroke. The outer power piston produces power and absorbs engine excessive heat by utilizing hot compressed air with or without steam/water. The connecting rods connect the compression piston and both power pistons to their respective crankshafts. The compression crankshaft converts rotational movement into compression piston reciprocating movement. The power crankshaft converts inner and outer power pistons reciprocating movement into engine rotational output movement. The crankshaft connecting rods transfer the power crankshaft rotation into compression crankshaft rotation.

In another embodiment, the engine intake valve includes a shaft having a conic shaped sealing surface, same as used in most four stroke engines. The exhaust valve includes a shaft having a conic shaped sealing surface, same as in most four stroke engines. The interstage valve (in the preferable embodiment) is composed of a shaft having a conic shaped sealing surface.

In another embodiment, a method of improving combustion engine efficiency includes separating the intake and compression chamber (cool strokes) from the combustion and exhaust chamber (hot strokes), and thus enabling reduced temperature during intake and compression strokes and increased temperature during the combustion stroke, thereby increasing engine efficiency.

In a further embodiment, a method of improving engine efficiency includes minimizing or reducing the temperature during intake and compression strokes. The lower the incoming and compressed air/charge temperature is, the higher the engine efficiency will be.

In yet another embodiment, a method of improving engine efficiency includes regenerating and utilizing exhaust thermal energy.

In a further embodiment, a dual piston combustion engine is provided that greatly reduces external cooling requirements which in turn increases the potential heat available for heat output work conversion during the power stroke, which also burns fuel more efficiently and thereby decreases harmful emissions.

In another embodiment, a method of providing an improved efficiency combustion engine includes performing the intake and compression in a first cylinder and performing the power and exhaust strokes in a second cylinder, wherein the first cylinder is maintained at a cooler temperature than the second cylinder. In a further embodiment, the method also includes injecting the compressed air and fuel mixture from the first cylinder into the second cylinder, thereby cooling the second cylinder.

In another embodiment, a steam enhanced dual piston combustion engine additionally comprises a ring-shaped chamber in the combustion cylinder to receive compressed gases and/or liquids utilizing excess engine heat to produce additional power and increase engine efficiency. In a further embodiment a steam enhanced dual piston combustion engine additionally comprises a ring-shaped chamber in the compression cylinder to facilitate efficient transfer of compressed gases and/or liquids to the steam chamber. In an additional embodiment, a steam enhanced dual piston combustion engine contains two separate power producing systems, with a primary system utilizing fuel-air combustion and secondary system utilizing excess engine heat for steam power generation.

BRIEF DESCRIPTION OF THE DRAWINGS

FIG. 1 is a simplified cross-sectional side view of a DPCE apparatus, in accordance with one embodiment of the invention, wherein the crankshaft angle is illustrated at 270 degrees.

FIG. 2 is a simplified cross-sectional side view of the DPCE apparatus of FIG. 1, wherein the crankshaft angle is illustrated at 315 degrees.

FIG. 20 is a 3D simplified illustration of a DPCE crankshaft system, having crankshaft gear wheels as the connecting mechanism, in accordance with one embodiment of the invention.

FIG. 21 is a 3D simplified illustration of a DPCE crankshaft system, having crankshaft gear wheels as the connecting mechanism, in accordance with another embodiment of the invention.

FIG. 34 is a cross-sectional view of an SE-DPCE apparatus that includes a boiler chamber, in accordance with another embodiment of the invention.

DETAILED DESCRIPTION OF THE INVENTION

Figure 3:
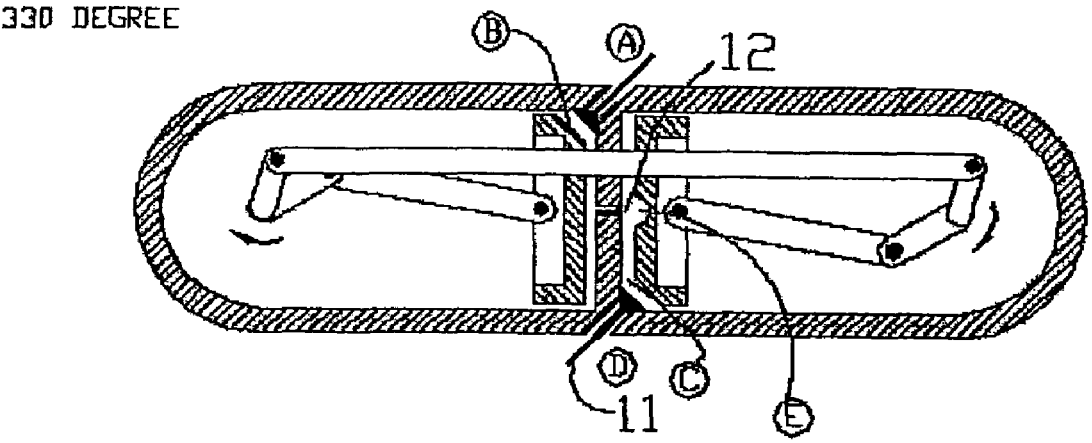
FIG. 3 is a simplified cross-sectional side view of the DPCE apparatus of FIG. 1, wherein the crankshaft angle is illustrated at 330 degrees.

The invention is described in detail below with reference to the figures, wherein similar elements are referenced with similar numerals throughout. It is understood that the figures are not necessarily drawn to scale. Nor do they necessarily show all the details of the various exemplary embodiments illustrated. Rather, they merely show certain features and elements to provide an enabling description of the exemplary embodiments of the invention.

Referring to FIG. 1, in accordance with one embodiment of the invention, a DPCE cylinder includes: a compression cylinder 01, a power cylinder 02, a compression piston 03, a power piston 04, two respective piston connecting rods 05 and 06, a compression crankshaft 07, a power crankshaft 08, a crankshaft connecting rod 09, an intake valve 10, an exhaust valve 11 and an interstage valve 12. The compression cylinder 01 is a piston engine cylinder that houses the compression piston 03, the intake valve 10 and part of the interstage valve 12. The power cylinder 02 is a piston engine cylinder that houses the power piston 04, the exhaust valve 11, part of the interstage valve 12 and a spark plug (not shown) located in front of the surface of power piston 04 facing the combustion chamber in cylinder 02. The compression piston 03 serves the intake and the compression engine strokes. The power piston 04 serves the power and the exhaust strokes. The connecting rods 05 and 06 connect their respective pistons to their respective crankshafts. The compression crankshaft 07 converts rotational movements into compression piston 03 reciprocating movement. The reciprocating movement of the power piston 04 is converted into rotational movement of the power crankshaft 08, which is in turn converted to engine rotational movement or work (i.e., crankshaft 08 serves as the DPCE output shaft). The crankshaft connecting rod 09 translates the rotation of power crankshaft 08 into rotation of the compression crankshaft 07.

In one embodiment, the intake valve 10 is composed of a shaft having a conic shaped sealing surface, the same as is used for intake valves in most conventional four stroke engines. The exhaust valve 11 is composed of a shaft having a conic shaped sealing surface, the same as is used for exhaust valves in most conventional four stroke engines. The interstage valve 12 is also composed of a shaft having a conic shaped sealing surface.

Referring again to FIG. 1, within the compression cylinder 01 inner cavity B is a compression piston 03. The compression piston 03 moves relative to the compression cylinder 01 in the direction as indicated by the illustrated arrows. Within the power cylinder 02 inner cavity C is a power piston 04. The power piston 04 moves relative to the power cylinder 02 in the direction as indicated by the illustrated arrows. The compression cylinder 01 and the compression piston 03 define chamber B. The power cylinder 02 and the power piston 04 define chamber C. In a preferred embodiment, the power piston pressure surface has a shaped hollow cavity 26 (see also FIG. 12) that supplements chamber C and functions as an additional combustion chamber volume during combustion. Chamber B through an interstage mechanical operated valve 12 is in fluid communication with chamber C. Compression cylinder 01 has an intake valve 10. Chamber B through intake valve 10 is in fluid communication with carbureted fuel/air charge A. Power cylinder 02 has an exhaust valve 11. Chamber C through exhaust valve 11 is in fluid communication with ambient air D. When in open position, exhaust valve 11 allows exhaust gases to exhale. During a combustion stroke the power piston 04 pushes the power connecting rod 06, causing the power crankshaft 08 to rotate clockwise. During an exhaust stroke, inertial forces (initiated by flywheel mass—not shown) cause the power crankshaft 08 to continue its clockwise rotation, and cause the power connecting rod 06 to move power piston 04, which in turn exhales burnt fuel exhaust through valve 11. The power crankshaft 08 rotation through a crankshaft connecting rod 09 articulates the compression crankshaft 07 for synchronous rotation (i.e., both crankshafts rotate at the same speed and dynamic angles). In one embodiment, both pistons, the power piston 04 and the compression piston 03 pass through their top dead center (TDC) positions and through their bottom dead center (BDC) positions at the same time. In alternative embodiments, depending on desired timing configurations, the relative positions of the power piston 04 and the compression piston 03 may be phase-shifted by a desired amount. In one embodiment, the DPCE dual cylinder apparatus utilizes conventional pressurized cooling and oil lubrication methods and systems (not shown). Although in embodiments according to the present invention the power chamber C structure components (such as the cylinder 02 and piston 04) maintain a much higher temperature than conventional combustion engines, in one embodiment, the components of the power chamber C are temperature controlled using a cooling system. Moreover, some or all of the components may be fabricated out of high-temperature resistant materials such as ceramics, carbon, or stainless steel. In further embodiments, the DPCE apparatus can utilize well-known high voltage timing and spark plug electrical systems (not shown) as well as an electrical starter motor to control spark plug ignitions, timing, and engine initial rotation.

Figure 4:
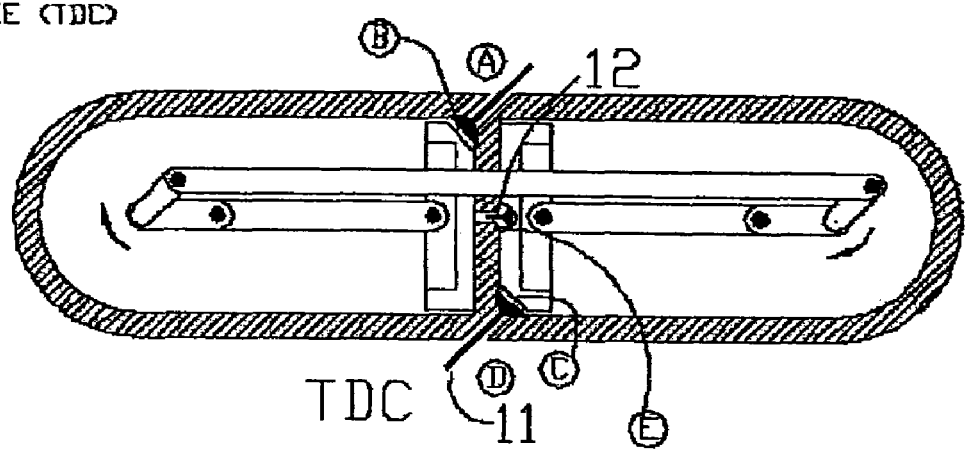
FIG. 4 is a simplified cross-sectional side view of the DPCE apparatus of FIG. 1, wherein the crankshaft angle is illustrated at 0 degrees.
Figure 5:
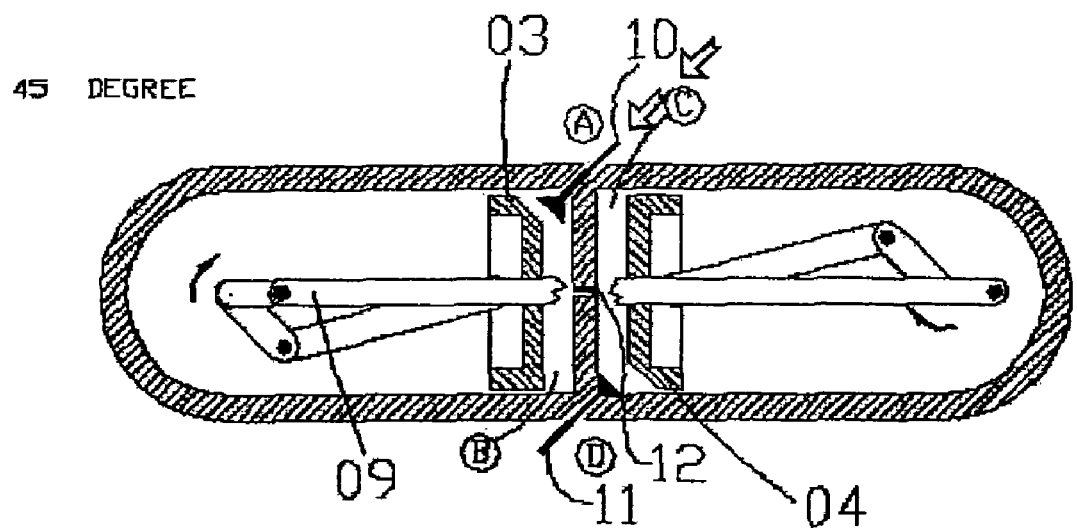
FIG. 5 is a simplified cross-sectional side view of the DPCE apparatus of FIG. 1, wherein the crankshaft angle is illustrated at 45 degrees.
Figure 6:
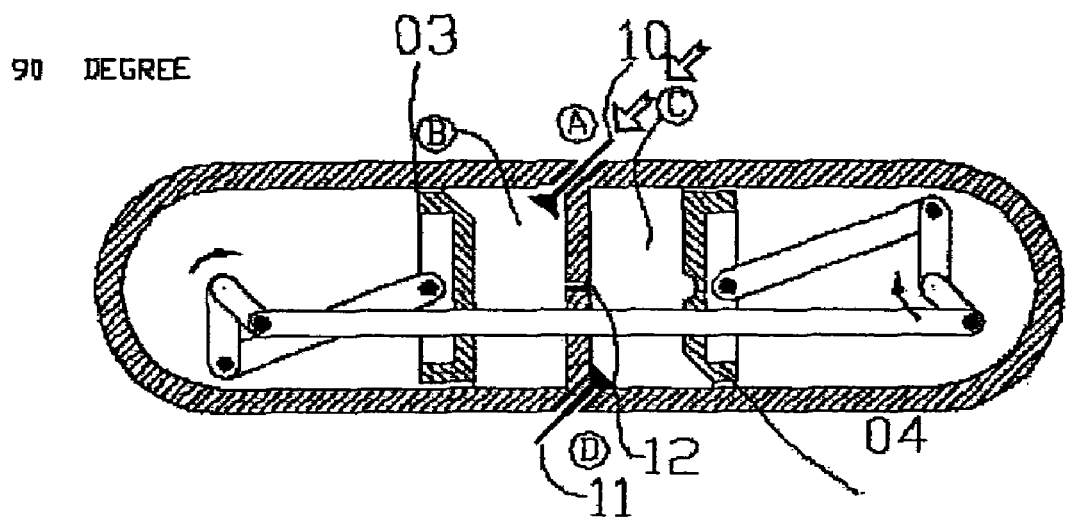
FIG. 6 is a simplified cross-sectional side view of the DPCE apparatus of FIG. 1, wherein the crankshaft angle is illustrated at 90 degrees.
Figure 7:
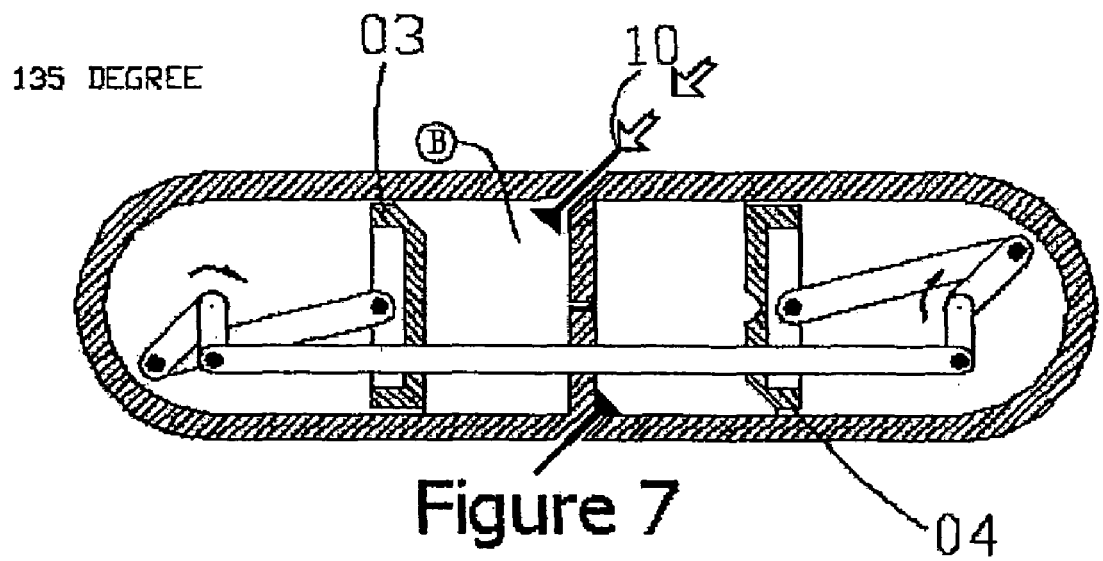
FIG. 7 is a simplified cross-sectional side view of the DPCE apparatus of FIG. 1, wherein the crankshaft angle is illustrated at 135 degrees.
Figure 8:
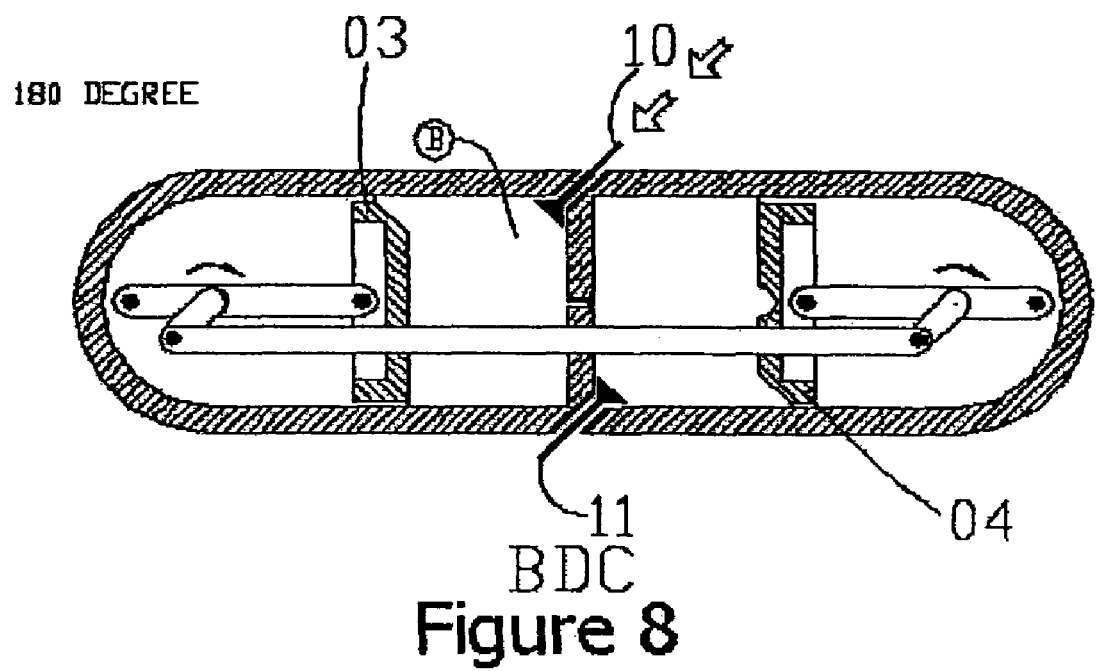
FIG. 8 is a simplified cross-sectional side view of the DPCE apparatus of FIG. 1, wherein the crankshaft angle is illustrated at 180 degrees.
Figure 9:
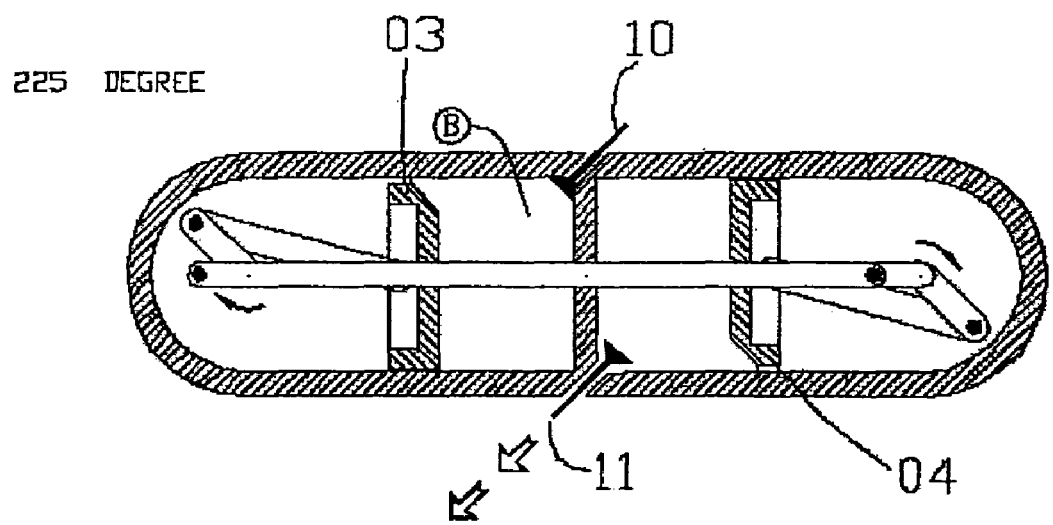
FIG. 9 is a simplified cross-sectional side view of the DPCE apparatus of FIG. 1, wherein the crankshaft angle is illustrated at 225 degrees.

As illustrated in FIGS. 1 through 9, as an electrical starter engages DPCE output shaft 6' (FIG. 15), both crankshafts 07 and 08 start their clockwise rotation and both pistons 03 and 04 begin their reciprocating motion. As illustrated in FIG. 5, the compression piston 03 and the power piston 04 move in the direction that increases chamber B and chamber C volume. Since intake valve 10 is in its open position and because at this stage chamber B volume constantly increases, carbureted fuel or fresh air charge (when using a fuel injection system) flows from point A (which represents carburetor output port, for example) through intake valve 10 into chamber B. As shown in FIGS. 6 through 8, respectively, chamber B volume increases while fuel—air charge flows in. As compression piston 03 reaches its BDC point, intake valve 10 closes trapping chamber B air—fuel charge content. While crankshafts clockwise rotation goes on, and as shown in FIG. 9 and FIG. 1 through 3 respectively, chamber B volume decreases and its now trapped air—fuel charge temperature and pressure increases. As the compression piston 03 approaches a predetermined point (FIG. 3), interstage valve 12 opens and chamber B air—fuel charge flows into chamber C. As the compression piston approaches its TDC point (according to some embodiments some delay or advance may be introduced), the interstage valve 12 simultaneously closes and a spark plug firing occurs.

FIGS. 5 through 8 illustrate the power stroke. As combustion occurs chamber C pressure increases forcefully pushing power piston 04 which in turn moves connecting rod 06 to rotate power crankshaft 08, which is coupled to a DPCE output shaft 06'. Meanwhile, as compression piston 03 is pushed back from its TDC position, intake valve 10 reopens allowing a new air fuel charge A to be sucked into chamber B.

The exhaust stroke begins when power piston 04 reaches its BDC point (FIG. 8). The exhaust valve 11 opens and as chamber C volume decreases the burned exhaust gases are pushed out from chamber C through open exhaust valve 11 into the ambient environment D.

Thus, the DPCE engine divides the strokes performed by a single piston and cylinder of convention combustion engines into two thermally differentiated cylinders in which each cylinder executes half of the four-stroke cycle. A "cold" cylinder executes the intake and compression strokes and a thermally isolated "hot" cylinder executes the combustion and exhaust strokes. Compared to conventional engines, this innovative system and process enables the DPCE engine to work at higher combustion chamber temperatures and at lower intake and compression chamber temperatures. Utilizing higher combustion temperatures while maintaining lower intake and compression temperatures reduces engine cooling requirements, lowers compression energy requirements and thus boosts engine efficiency. Additionally, thermally isolating the power cylinder from the external environment limits external heat losses, allows the reuse of the same heat energy in the next stroke, and burns less fuel in each cycle.

Figure 10:
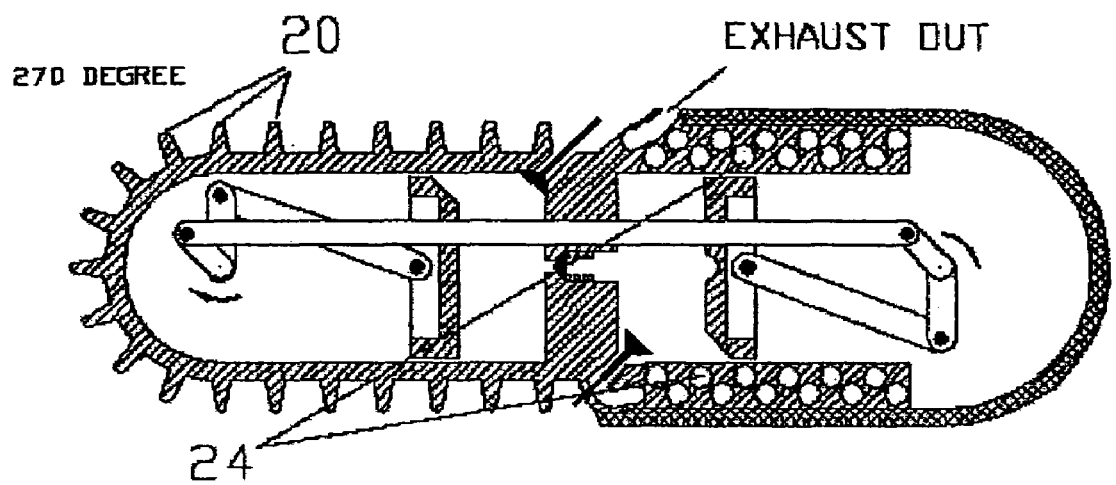
FIG. 10 is a simplified cross-sectional side view of a DPCE apparatus having an air-cooled compression cylinder and an exhaust-heated power cylinder, in accordance with one embodiment of the invention.
Figure 11:
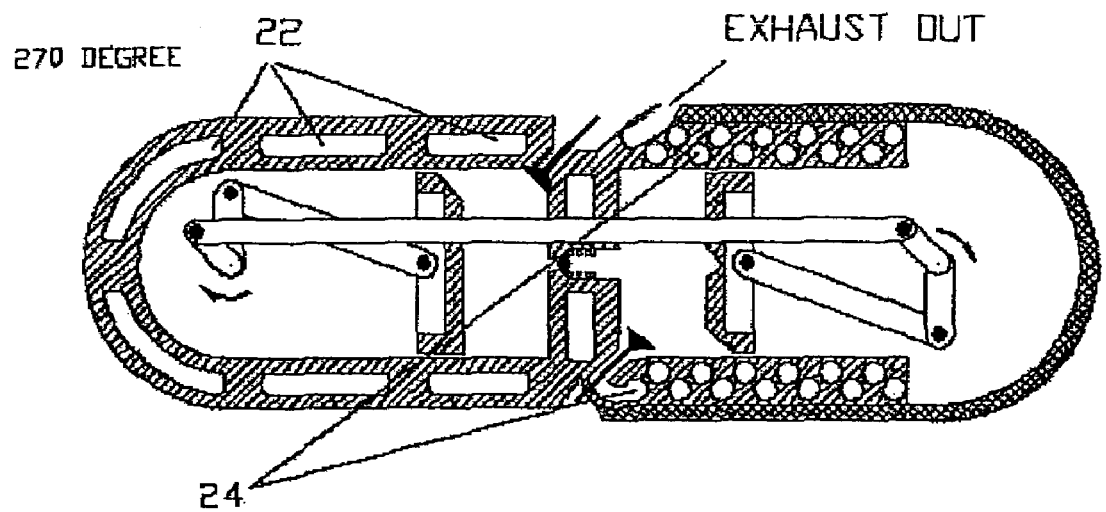
FIG. 11 is a simplified cross-sectional side view of a DPCE apparatus having a water-cooled compression chamber and an exhaust-heated power chamber, in accordance with one embodiment of the invention.
Figure 26:
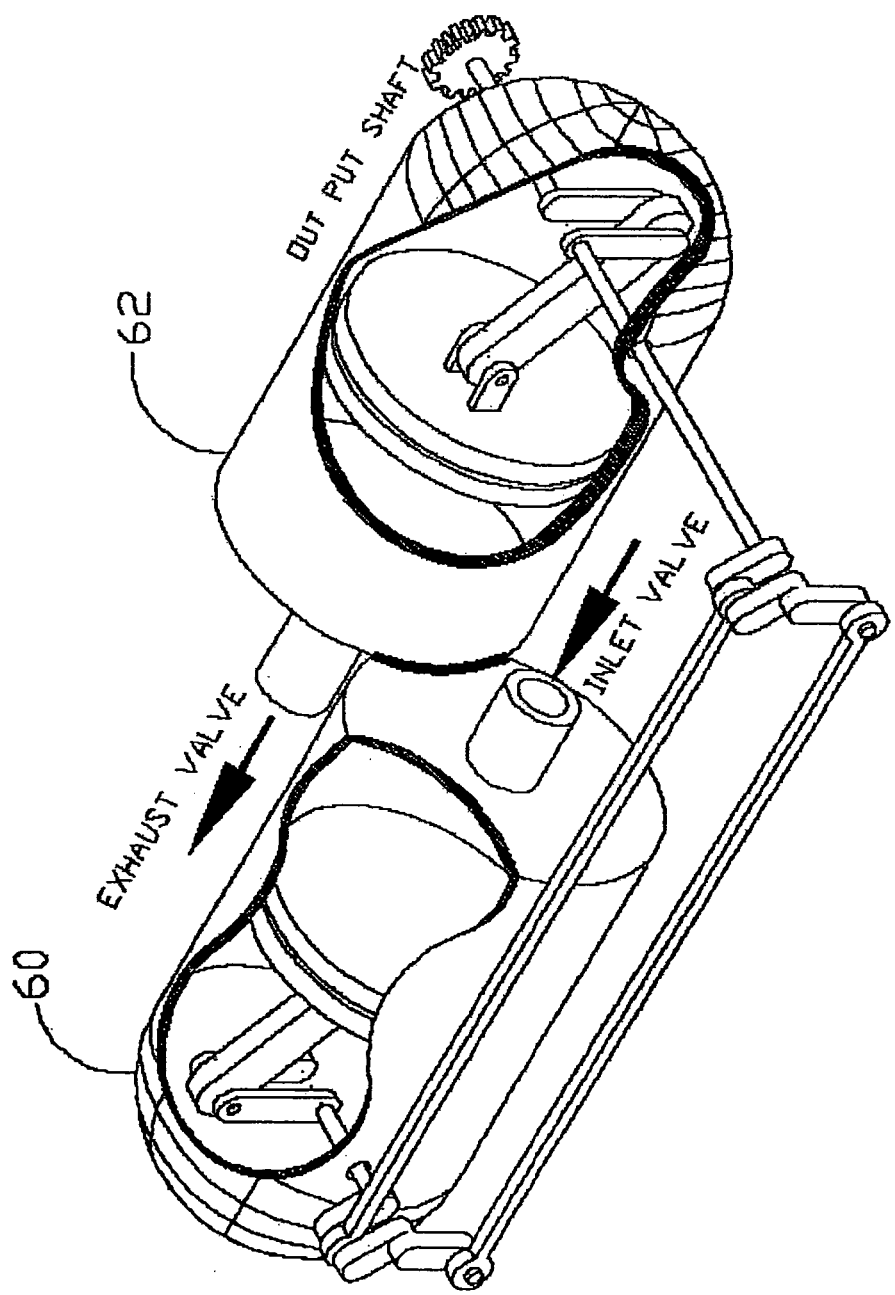
FIG. 26 is a 3D simplified illustration of a DPCE apparatus having the compression cylinder and the power cylinder on different planes, in accordance with one embodiment of the invention.

In one embodiment, the compression cylinder 01 is similar to a conventional piston engine cylinder that houses the compression piston 03, the intake valve 10, and part of the interstage valve 12. The compression cylinder 01 works in conjunction with the compression piston 03 to suck and compress incoming air and/or fuel charge. In a preferable embodiment the compression cylinder is cooled. FIG. 10 shows an air cooled compression cylinder having heat absorbing and radiating ribs 20. FIG. 11 shows a liquid cooled compression cylinder having liquid coolant passages 22. In preferred embodiments, the cooling air source or the liquid coolant sources can be the same as well known in the previous art. In a preferable embodiment, the compression cylinder 01 and the power cylinder 02 should be thermally isolated from each other, as well as the surrounding environment. FIG. 26 illustrates an embodiment in which the two cylinders are constructed in dissimilar planes, and thus, exercise minimum reciprocal conductivity between the cylinders.

Figure 12:
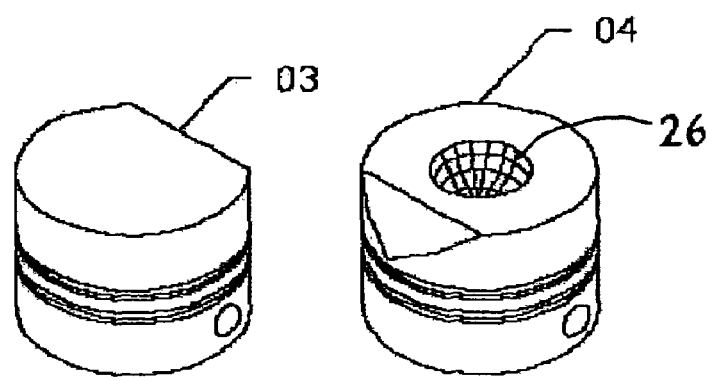
FIG. 12 is a 3-Dimensional (3D) simplified illustration of the DPCE compression and power pistons, in accordance with one embodiment of the invention.

The power cylinder 02 is a piston engine cylinder that houses the power piston 02, the exhaust valve 11, part of the interstage valve 12, and a spark plug (not shown). The power cylinder 02 functions in conjunction with the power piston 04 to combust a compressed air/fuel mixture within a chamber of the cylinder 02 and transfer the resulting energy as mechanical work to the power crankshaft 08. During the second half of its reciprocating movement cycle, the power piston 04 works to exhale or push the exhaust gases out from the cylinder 02 via the exhaust valve 11. The power cylinder 02 accommodates a spark plug located in front of the surface of power piston 04 facing the combustion chamber in cylinder 02. As shown in FIG. 12, in one embodiment, the power piston 04 has a shaped hollow cavity 26, which serves as a combustion chamber. During the exhaust stroke, the power piston 04 pushes the burned gases out of the cylinder 02 via exhaust valve 11.

In one preferred embodiment, the power cylinder 02 is exhaust heated, in addition to being externally thermally isolated. FIGS. 10 and 11 illustrate exhaust heat utilization as exhaust gases, during their exhale stream, conduct heat into power cylinder heating passages 24.

As explained above, the compression connecting rod 05 connects the compression crankshaft 07 with the compression piston 03 causing the piston 03 to move relative to the cylinder in a reciprocating motion. The power connecting rod 06 connects the power crankshaft 08 with the power piston 04. During the combustion phase, the power connecting rod 06 transfers the piston 04 movement into the power crankshaft 08 causing it to rotate. During the exhaust phase, the power crankshaft 08 rotation and momentum pushes the power piston 04 back toward the compression cylinder 01, which causes the burned gases to be exhaled via the exhaust valve (exhaust stroke).

Figure 13:
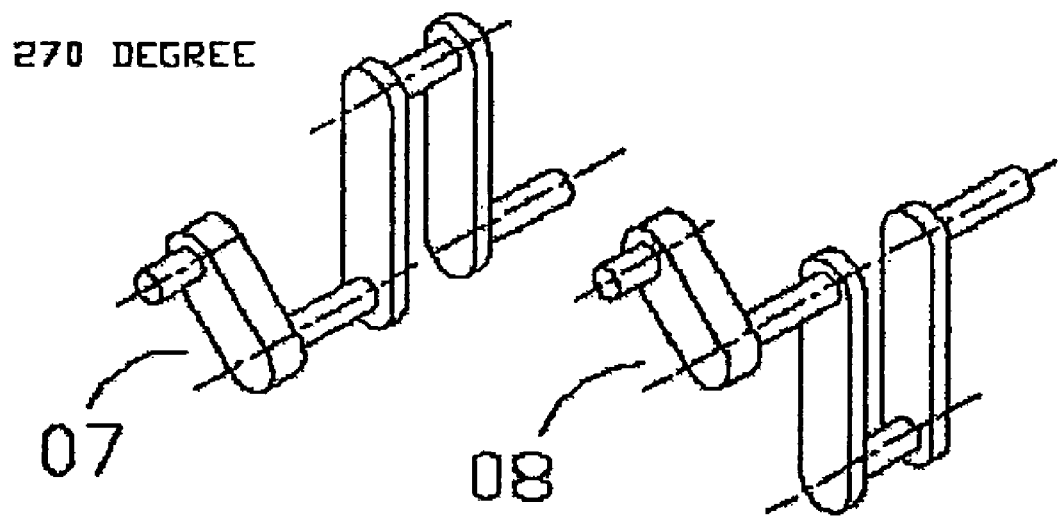
FIG. 13 is a 3D simplified illustration of the DPCE compression and power crankshafts, in accordance with one embodiment of the invention.

Referring to FIG. 13, the compression crankshaft 07 converts rotational movement into compression piston 03 reciprocating movement. The compression crankshaft 07 connects the compression connecting rod 05 (FIG. 1) with the crankshaft connecting rod 09. Movement of the crankshaft connecting rod 09 causes the compression crankshaft 07 to rotate. Compression crankshaft 07 rotations produce movement of the compression connecting rod 05 that in turn moves the compression piston 03 relative to its cylinder housing 01 in a reciprocating motion.

Figure 14:
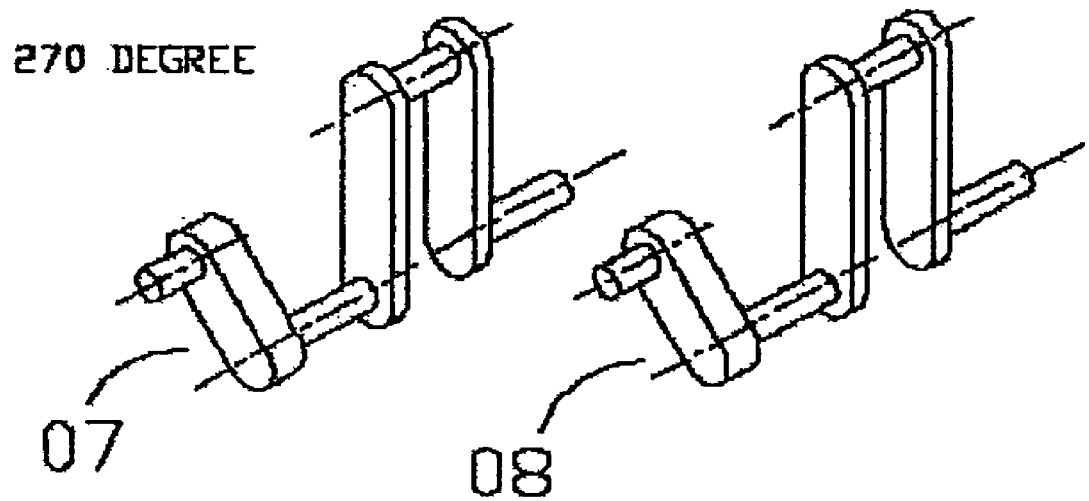
FIG. 14 is a 3D simplified illustration of the DPCE compression and power crankshafts, in accordance with one embodiment of the invention.

In various embodiments of the invention, the compression crankshaft 07 and power crankshaft 08 structural configuration may vary in accordance with desired engine configurations and designs. For example, some crankshaft design factors are: number of dual cylinders, relative cylinder positioning, crankshaft gearing mechanism, and direction of rotation. For example, if the compression crankshaft 07 and the power crankshaft 08 rotate in the same direction, the axes of the crankshafts 07 and 08 should be positioned 180 degrees from each other, as illustrated in FIG. 13. Alternatively, if the compression and power crankshafts 07 and 08, respectively, rotate in opposite directions, both crankshaft axes should be positioned in phase with respect to one another, as shown in FIG. 14.

The power crankshaft 08 connects the power connecting rod 06 with the crankshaft connecting rod 09. As combustion occurs, the power piston 04 movement, through its power connecting rod 06, causes the power crankshaft 08, which is also coupled to the engine output shaft (not shown), to rotate, which causes the connecting rod 09 to rotate the compression crankshaft 07 and generate reciprocal movement of the compression piston 03.

Figure 15:
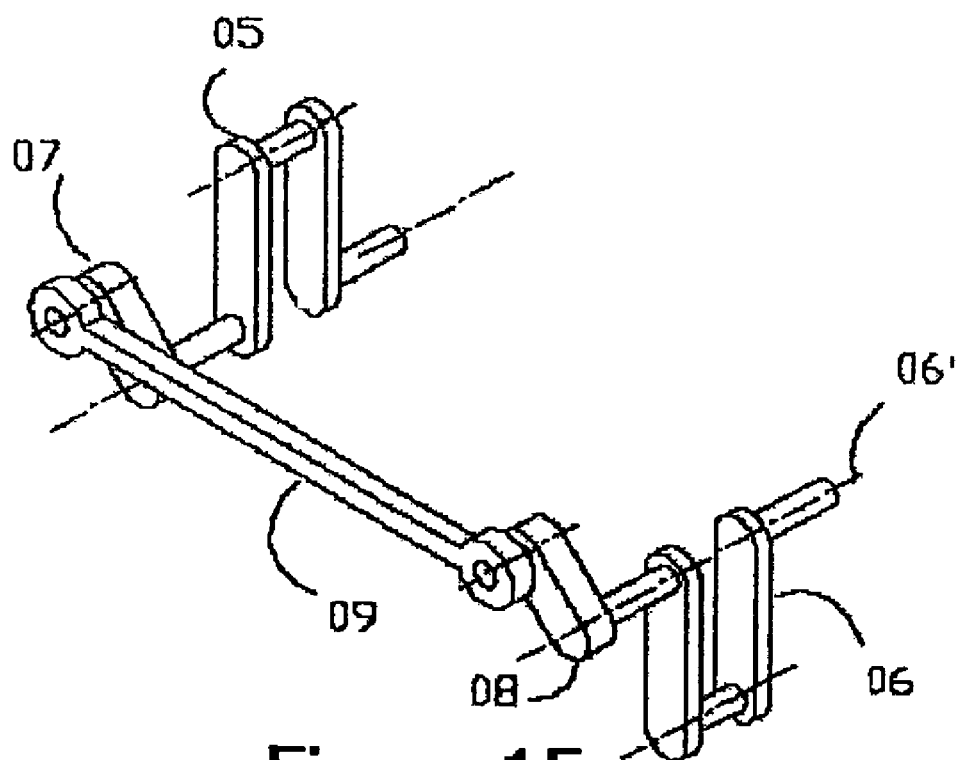
FIG. 15 is a 3D simplified illustration of a DPCE crankshafts system, illustrating a crankshaft connecting rod, in accordance with one embodiment of the invention.

The crankshaft connecting rod 09 connects the power crankshaft 08 with the compression crankshaft 07 and thus provides both crankshafts with synchronous rotation. FIG. 15 illustrates a perspective view of the crankshaft connecting rod 09 coupled to respective crankshafts 07 and 08, in accordance with one embodiment of the invention. The function of the crankshaft connecting rod 09 is to link the power crankshaft 08 and the compression crankshaft 07. In certain designs, both crankshafts 07 and 08 may rotate synchronously and respectively relative to each other (same direction, same angle). In other designs the two crankshafts 07 and 08 may rotate in opposite directions with or without a predetermined phase angle.

Figure 17:
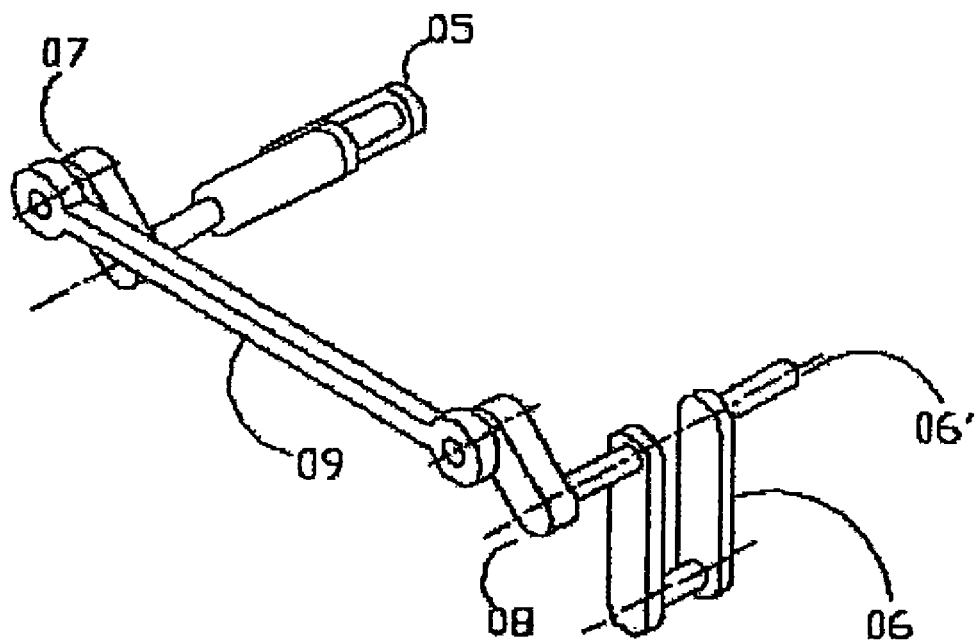
FIG. 17 is a 3D simplified illustration of a DPCE crankshaft system, illustrating dissimilar crankshaft angles, in accordance with one embodiment of the invention.

FIG. 17 illustrates perspective view of the connecting rod 09 coupled to respective crankshafts 07 and 08, which are in turn coupled to respective piston connecting rods 05 and 06, wherein the crankshafts 07 and 08 are oriented with respect to each other so as to provide a predetermined phase difference between the otherwise synchronous motion of the pistons 03 and 04. A predetermined phase difference means that in order to achieve a time difference between the compression piston TDC position, as illustrated in FIG. 4, and the power piston TDC position, a relative piston phase delay or advance can be introduced into either piston. FIG. 17 illustrates that the piston connecting rods 05 and 06 are out of phase with respect to each other so as to provide a desired phase delay or advance between the times the pistons 03 and 04 reach their respective TDC positions. In one embodiment, a phase delay is introduced such that the piston of the power cylinder moves slightly in advance of the piston of the compression cylinder, permitting the compressed charge to be delivered under nearly the full compression stroke and allowing the power piston to complete a full exhaust stroke. Such advantages of phase delays with the power piston leading the compression piston are also described in U.S. Pat. No. 1,372,216 to Casaday and U.S. Pat. Application No. 2003/0015171 A1 to Scuderi. In an alternative embodiment, an opposite phase delay is introduced such that the compression piston moves in advance of the power piston, wherein the power piston further compresses the charge from the compression cylinder before firing. The benefits of this approach are discussed in U.S. Pat. No. 3,880,126 to Thurston et al. and U.S. Pat. No. 3,959,974 to Thomas.

Figure 16:
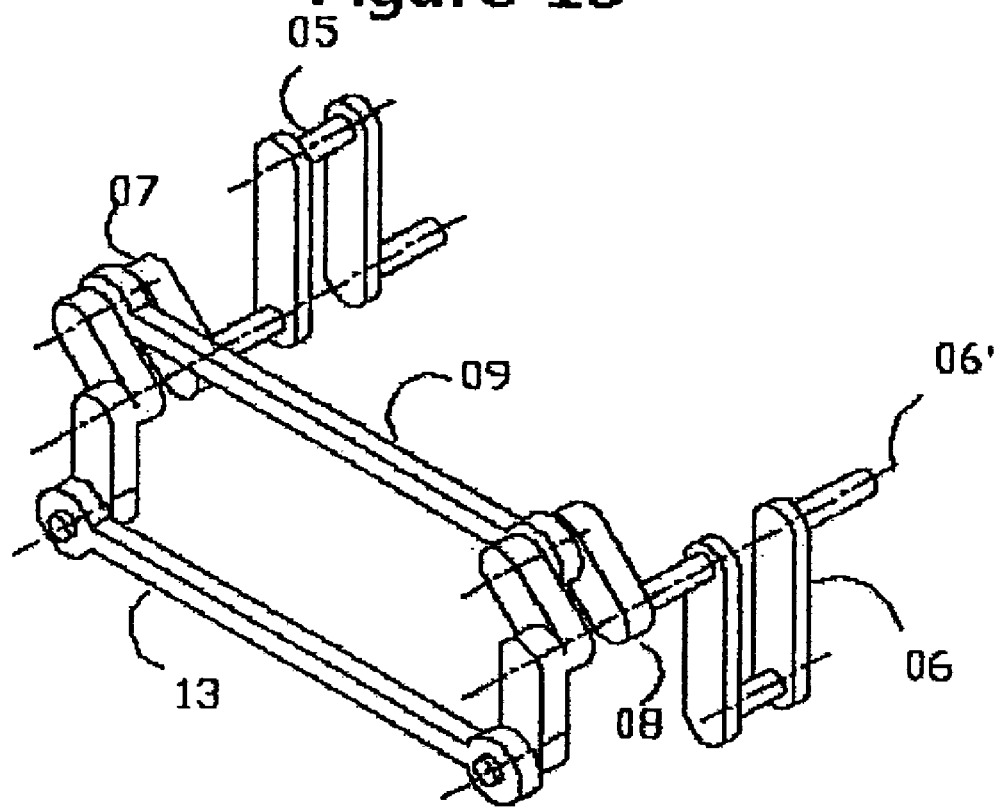
FIG. 16 is a 3D simplified illustration of a DPCE crankshaft system, having two crankshaft connecting rods, in accordance with one embodiment of the invention.

In an additional embodiment, in order to enforce proper direction of rotation of the compression crankshaft 07 and the power crankshaft 08, a second crankshaft connecting rod 13 is utilized as shown in FIG. 16.

Figure 18:
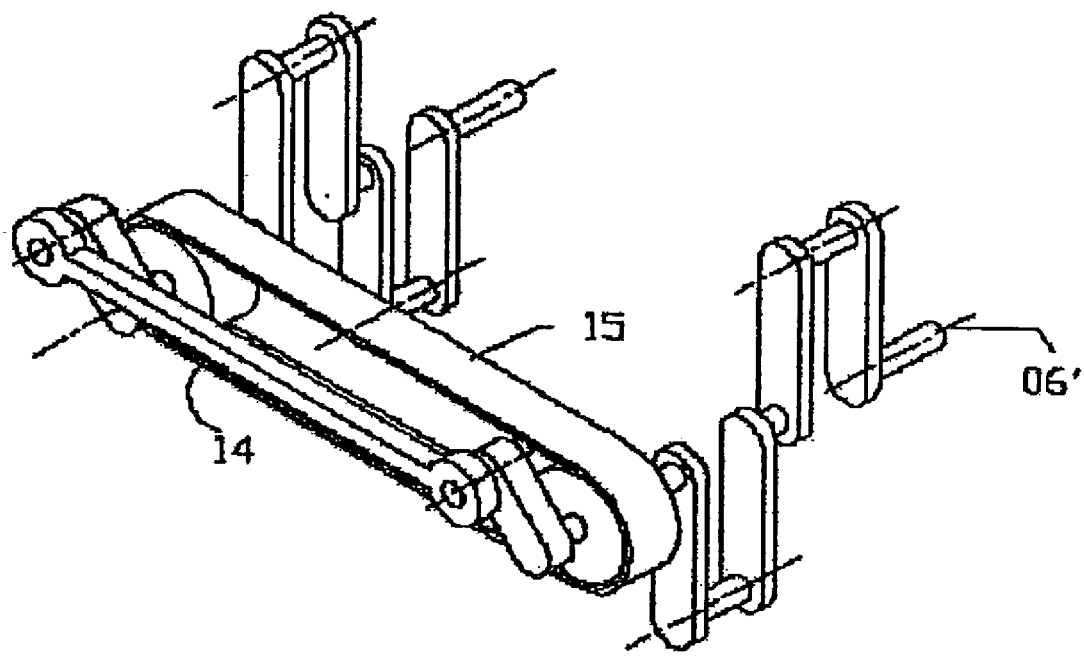
FIG. 18 is a 3D simplified illustration of a DPCE crankshaft system, having one crankshaft connecting rod in combination with a timing belt (or a chain or a V-shaped belt), in accordance with one embodiment of the invention.
Figure 19:
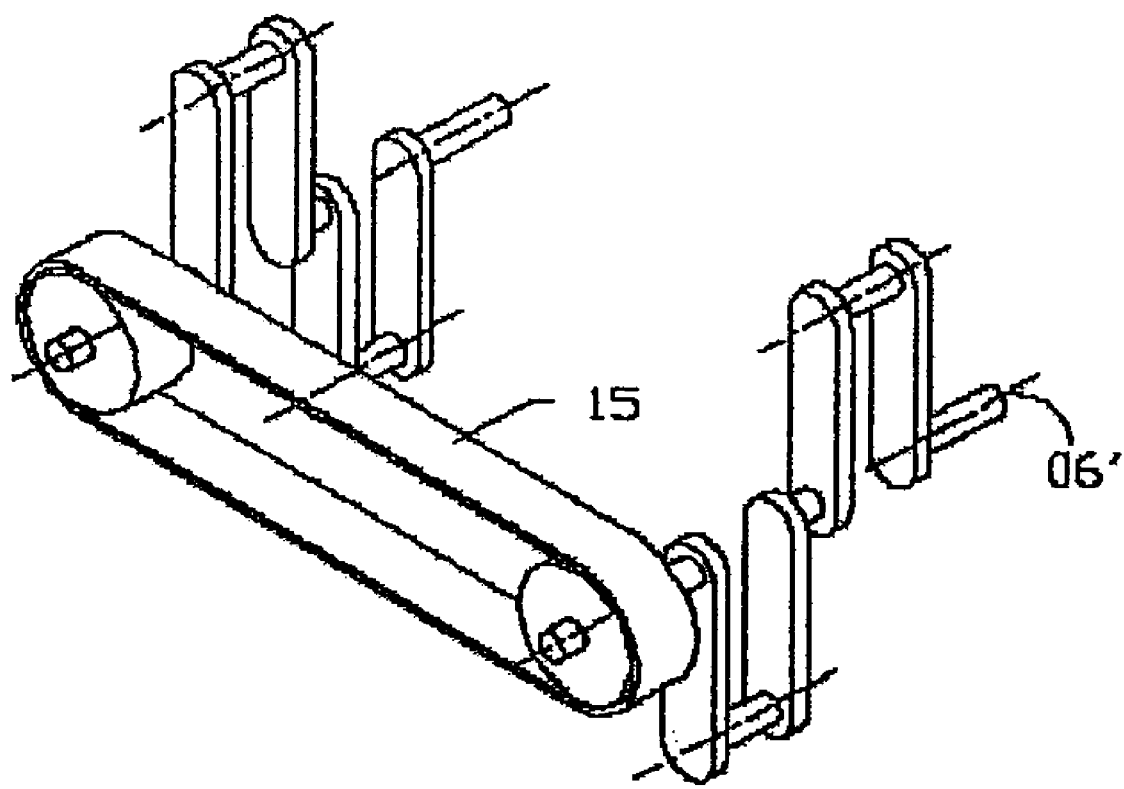
FIG. 19 is a 3D simplified illustration of a DPCE crankshaft system having solely a timing belt (or a chain or a V-shaped belt), in accordance with one embodiment of the invention.

Referring to FIG. 18, an alternative means to establish the direction of rotation of the crankshafts 07 and 08, may be implemented by having one crankshaft connecting rod 14 combined with a timing belt or a chain mechanism 15. As illustrated in FIG. 19, in another embodiment, a chain mechanism or a timing belt mechanism 15 may by itself serve as an alternative to any of the above-mentioned crankshaft connecting mechanisms.

FIGS. 20 and 21 illustrate alternative mechanisms to replace the crankshaft connecting rod 09. FIG. 20 illustrates crankshafts connecting gearwheels mechanism 30, comprising three gearwheels 32 engaged to each other. In this embodiment, both crankshafts 07 and 08 rotate in a unilateral direction (utilizing 3 gearwheels). FIG. 21 shows two embodiments of a crankshaft connecting gearwheels mechanisms 40 and 42 having an even number of gearwheels 32, thereby configured to turn crankshafts 07 and 08 in opposite directions.

In one embodiment, the intake valve 10 is composed of a shaft having a conic shaped sealing surface, the same as is used as intake valves in most four stroke engines. The intake valve 10 governs the ambient air or the carbureted air/fuel charge as they flow into the compression cylinder 01. The compression cylinder 01 has at least one intake valve. In preferred embodiments, relative to the compression pistons 03 momentary position, the intake valve location, function, timing and operation may be similar or identical to the intake valves of conventional four strokes internal combustion engines.

In one embodiment, the exhaust valve 11 is composed of a shaft having a conic shaped sealing surface, the same as is used in exhaust valves in most four stroke engines. The exhaust valve 11, located on the power cylinder 02 governs burned gaseous exhale flow. The power cylinder 02 has at least one exhaust valve. In preferred embodiments, the exhaust valve location, functions, timing and operation method may be similar or identical to exhaust valves found in well-known conventional four stroke combustion engines.

Figure 22:
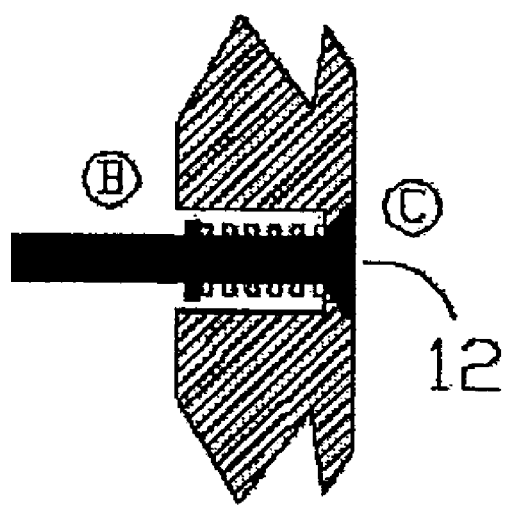
FIG. 22 is a simplified cross-sectional view of an interstage valve, in accordance with one embodiment of the invention.

Referring to FIG. 22, in one embodiment, the interstage valve 12 is composed of a shaft having a conic shaped sealing surface. The interstage valve governs the compressed air flow or the compressed carbureted air/fuel charge (collectively referred to herein as "fuel" or "fuel mixture") flow from a volume B within the compression cylinder 01 as it is pushed into a volume C within the power cylinder 02. The interstage valve 12 also prevents any reverse flow of fuel from volume C back into volume B. When in an open position, the interstage valve 12 enables compressed fuel to flow from the compression cylinder 01 into the power cylinder 02. During combustion and along the power stroke, the interstage valve 12 remains closed. In one embodiment, the interstage valve operation mechanism may be similar or identical to well-known combustion engine inlet or exhaust valve mechanisms. The closed or opened position of the interstage valve 12 is operated by mechanical linkages coupling or engagement with one of the dynamic DPCE shafts/parts (e.g., piston 03). It should also be understood that the exact valve timing depends on many engineering design considerations; however, as a general rule the interstage valve 12 should open around the time the exhaust valve 11 closes and remain closed during the power stroke and at least most of the exhaust stroke.

Figure 23:
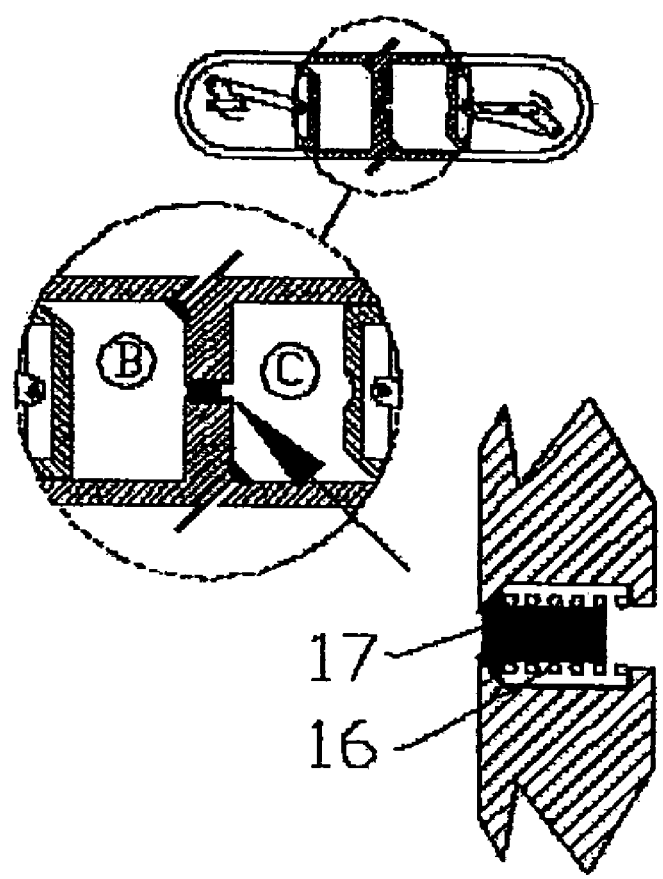
FIG. 23 is a simplified interstage relief valve cross-sectional illustration, in accordance with one embodiment of the invention.

Referring to FIG. 23, in another embodiment, a preloaded spring-operated relief valve 17 serves as the interstage valve 12. This embodiment provides an automatic valve that does not require any linkage based operating mechanism. During the intake and work strokes the working pressure and the preloaded spring 16 forces the valve stem 17 to remain closed and sealed. During the compression and exhaust strokes, the increased compressed fuel pressure in volume B along with the decreased exhaust pressure in volume C overcome the valve preloaded spring 16 forces and thus opens the valve stem 17, thereby allowing the compressed fuel to flow into the power cylinder 02 chamber C.

Figure 24:
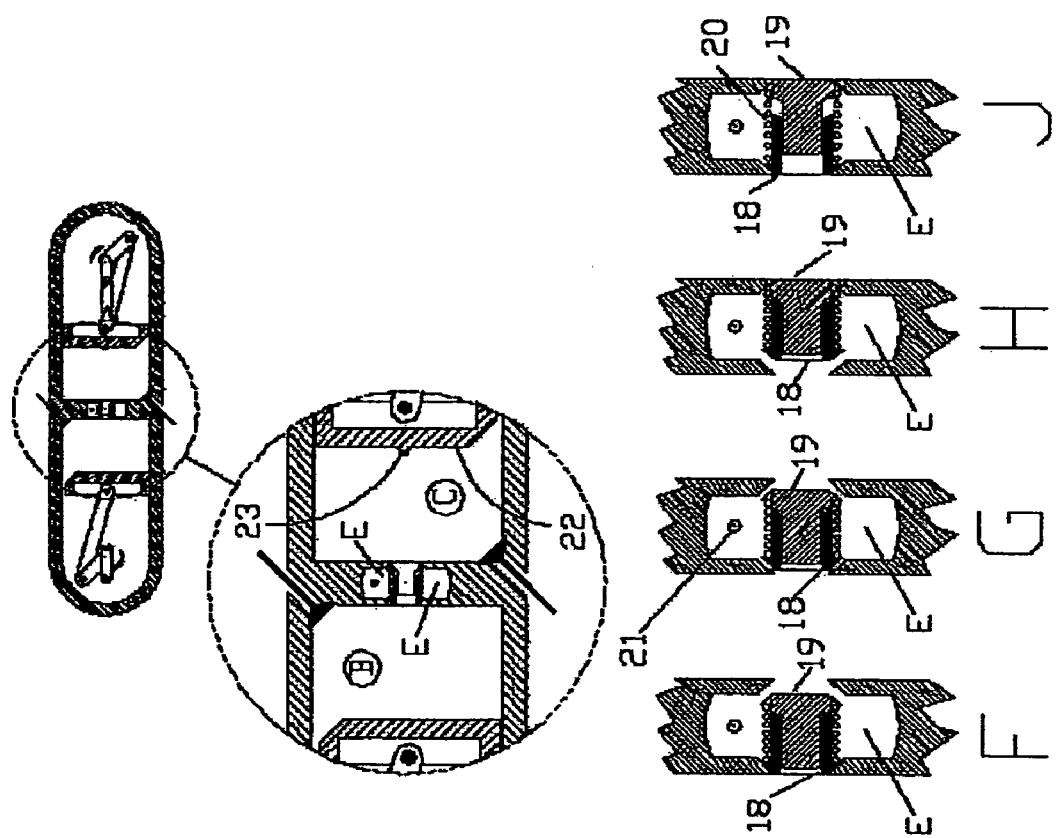
FIG. 24 is a simplified cross-sectional illustration of a semi automatic interstage valve, in accordance with one embodiment of the invention.

FIG. 24 illustrates a combination of a combustion chamber E with a unique semi automatic interstage valve comprising valve 18 having a cylindrical or ring portion that surrounds a plug valve 19. In this embodiment a combustion chamber E is sealed from the compression chamber B by the valve 18 and sealed from the working chamber C by valve 19. A spring 20 pushes simultaneity both valves 18 and 19 toward their corresponded closed positions. A spark plug 21 is located inside the combustion chamber E cavity. The combustion chamber E and interstage valve operation is as follows: As illustrated at stage J, during initial compression and exhaust strokes, spring 20 pushes valve stem 18 and valve stem 19 causing both valves to stay in a sealed closed position. At stage H, as the compression stroke progresses, its compressed air/charge pressure raises and in a certain stage the rising pressure, acting on valve 18, overcomes the spring 20 preload force, thereby forcing valve 18 to open and the compressed air/charge flows into combustion chamber E. At stage G, when the compression and work pistons approach their TDC positions, spark plug 21 is fired and a protruding portion 23 of the power piston 22 mechanically engages valve 19 forcing it to move and unseal (open) valve 19 that in turn engages and pushes valve 18 toward its closed position. Additionally, the rising combustion volume pressure works in conjunction with the power piston to force valve 18 to close. At stage F, when combustion occurs, chamber E pressure drastically and immediately rises, valve 18 is already closed and the hot combustion stream flows through valve 19 pushing power piston 22 away from the valve 19.

As the power piston 22 retreats back (during the power stroke), valve 19 stays open because of the differential pressure which exists between chamber C high combustion pressure vis-à-vis the much lower pressure that resides in chamber B which is now in its intake phase. The combustion chamber and interstage valve cycle ends as the power stroke ends. Spring 20 then pushes back valve 19 to its closed position as the power piston 22 begins its exhaust stroke.

Figure 25:
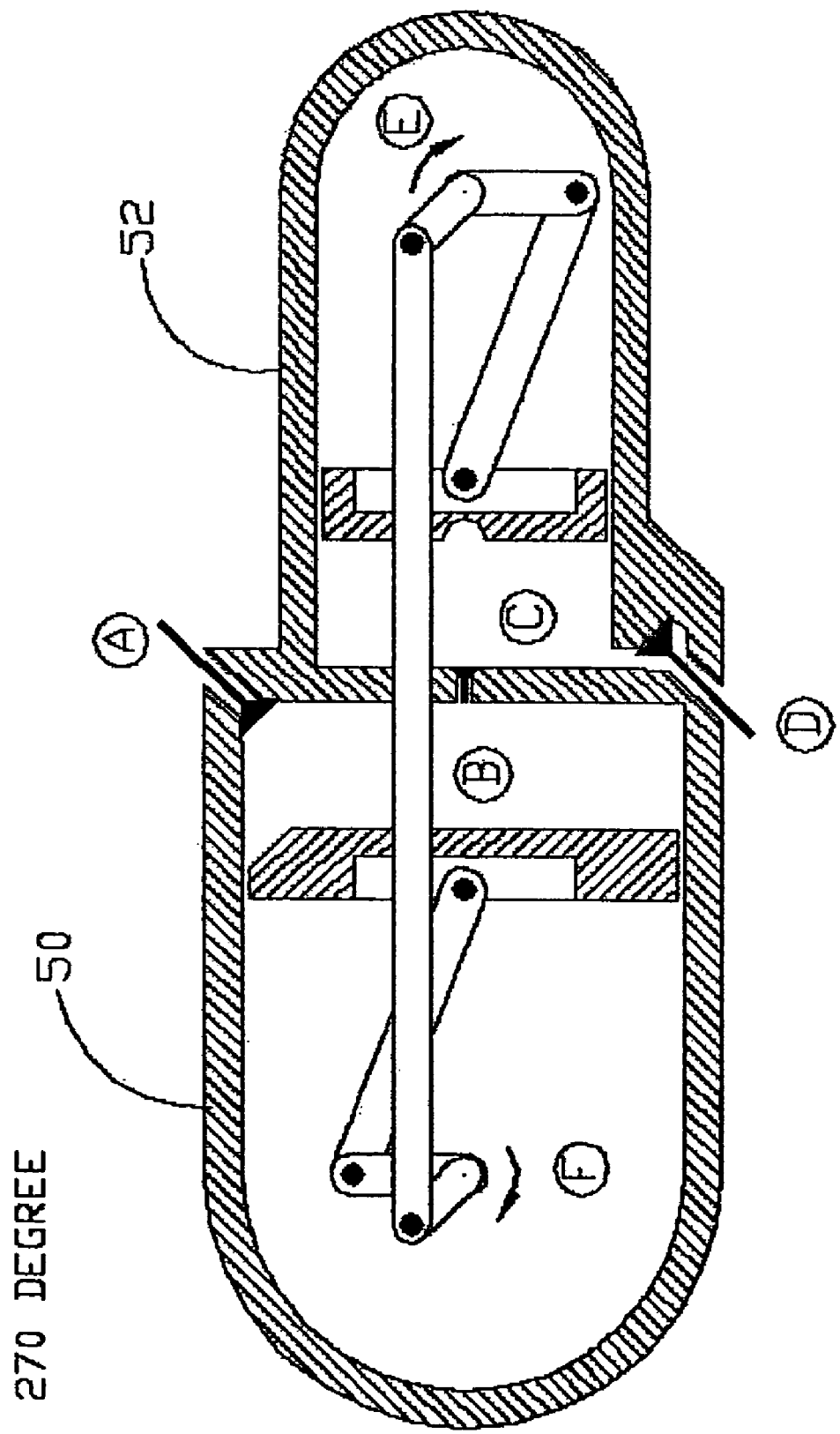
FIG. 25 is a simplified cross-section illustration of a DPCE apparatus having supercharge capabilities, in accordance with one embodiment of the invention.

FIG. 25 illustrates a DPCE dual cylinder configuration having supercharge capabilities, in accordance with one embodiment of the invention. As shown in FIG. 25, the compression cylinder portion 50 is larger than the power cylinder portion 52, therefore allowing a greater volume of air/fuel mixture to be received and compressed in the compression chamber B. At the completion of the compression stroke, the larger volume and increased pressure of compressed air/fuel mixture (i.e., "supercharged" fuel mixture) in the compression chamber B is injected into the combustion chamber C via interstage valve 12. Therefore, a greater amount and/or higher pressure of fuel mixture can be injected into the combustion chamber C of power cylinder 52 to provide a bigger explosion and, hence, more energy and work, during the power stroke.

As mentioned above, FIG. 26 illustrates an alternative DPCE dual cylinder configuration, in accordance with one embodiment of the invention, wherein the compression cylinder 60 is offset from the power cylinder 62, to provide minimal thermal conductivity between the two cylinders. In this embodiment, the interstage valve 12 is located in the small area of overlap between the two cylinders.

Figure 27:
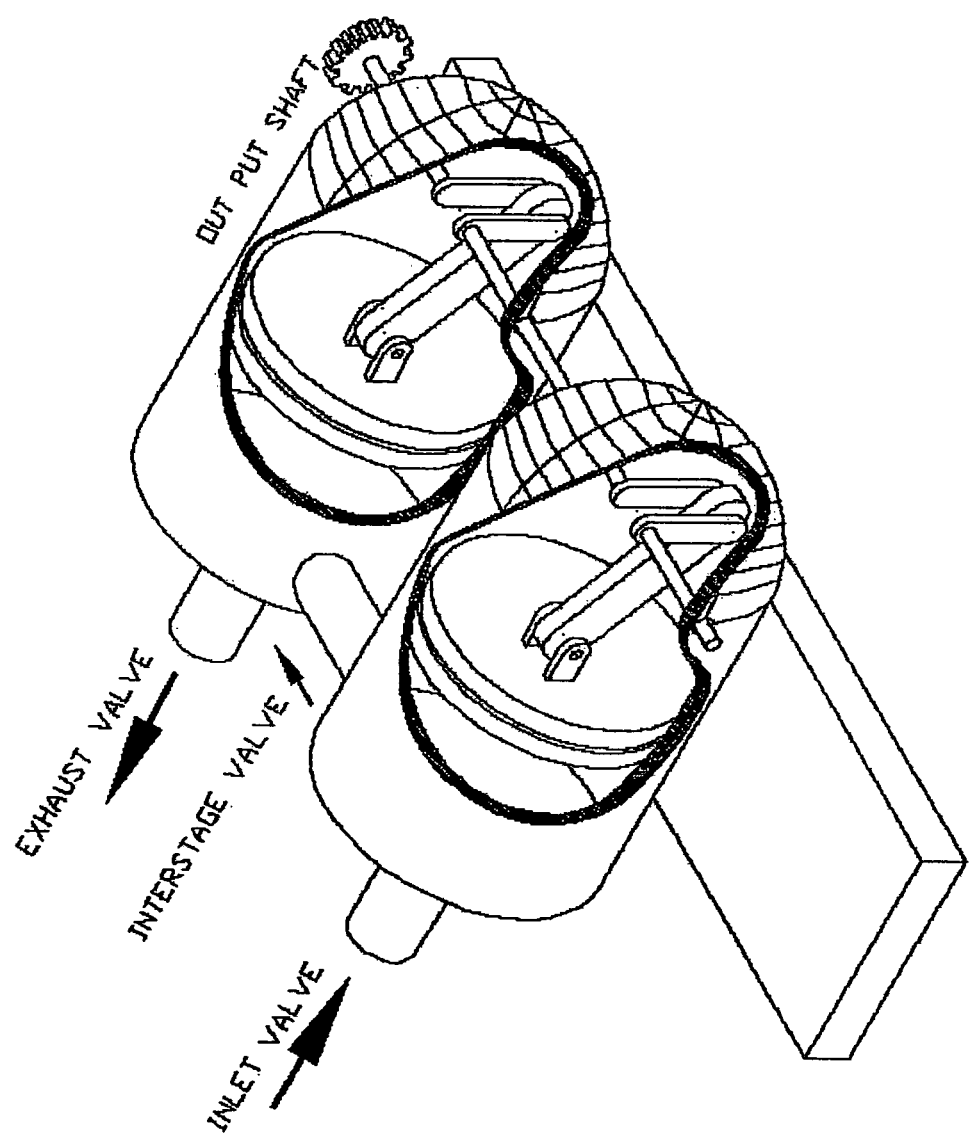
FIG. 27 is a 3D simplified illustration of a DPCE apparatus in which both cylinders are parallel to each other and both pistons move in a tandem manner, in accordance with one embodiment of the invention.

FIG. 27 illustrates a DPCE dual cylinder configuration in which both cylinders are constructed parallel to each other and both pistons are moving in a tandem manner, in accordance with a further embodiment of the invention. In this embodiment, the intake, exhaust, and interstage valves may operate in the same manner as described above. However, as shown in FIG. 27, the interstage valve is located in a lateral conduit that couples the first and second cylinders.

In an alternative embodiment according to the invention, a steam enhanced double piston cycle engine (SE-DPCE) is configured to use excess heat in the combustion chamber to convert added water into steam to increase engine efficiency and output. Like the DPCE described above, separating the compression stroke location from the power stroke location enables the development of significantly higher combustion chamber temperature. In this embodiment, the DPCE described above is extended to additionally comprise a unique ring-shaped steam cylinder that is located between the combustion chamber and the exhaust passage. The SE-DPCE utilizes concentrated heat residing in areas located between the combustion chamber and the internal surface of an exhaust tube shell, which is wrapped around the combustion piston cylinder.

Figure 28:
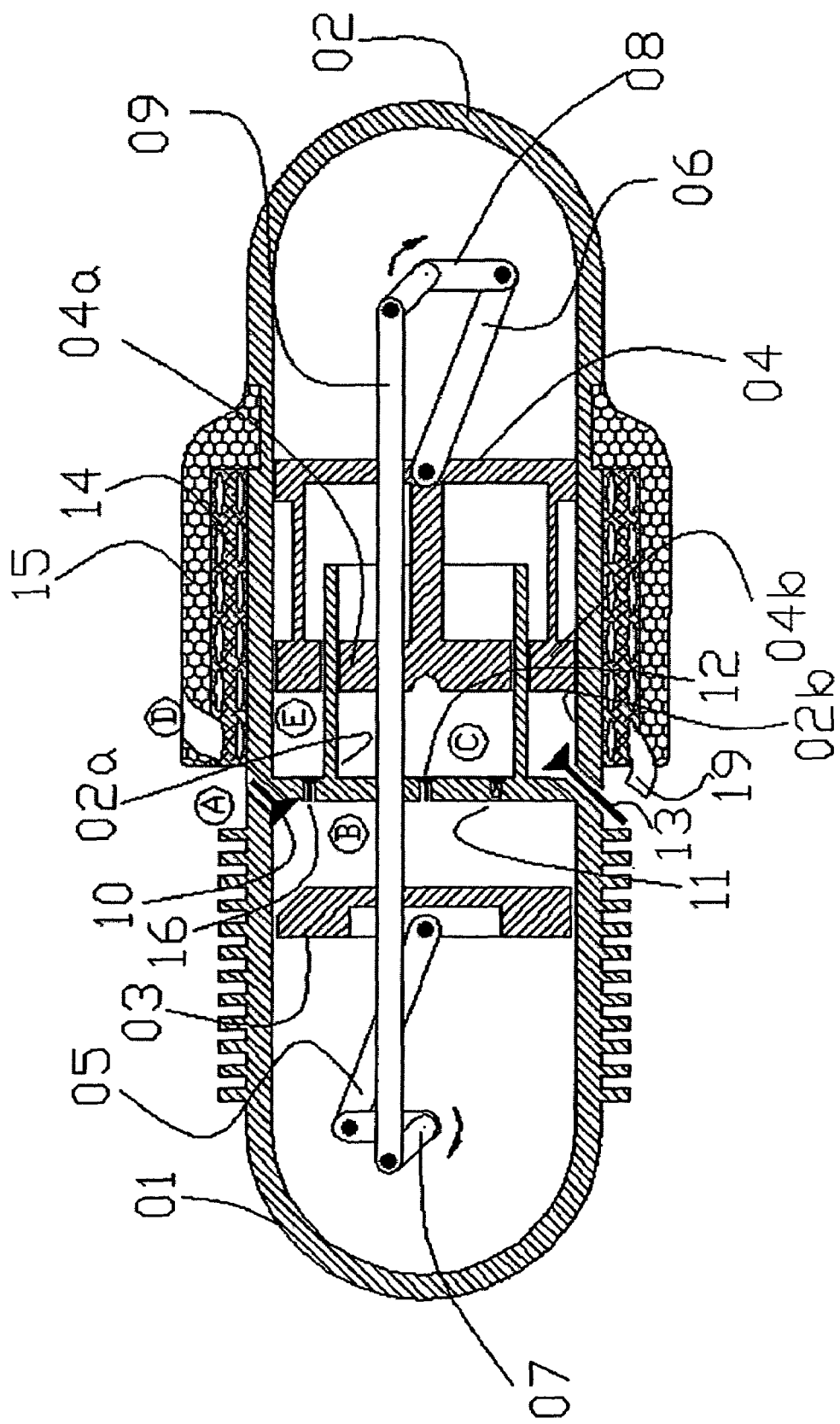
FIG. 28 is a simplified cross-sectional side view of a SE-DPCE apparatus, in accordance with one embodiment of the invention.

FIG. 28, in accordance with one embodiment of the invention, illustrates a cross-sectional view of a SE-DPCE that includes many similar features described above: a compression cylinder 01, a power cylinder 02, a compression piston 03, a power piston 04, two respective piston connecting rods 05 and 06, a compression crankshaft 07, a power crankshaft 08, a crankshaft connecting rod 09, an intake valve 10, a combustion exhaust valve 11, and part of an interstage valve 12. The compression cylinder 01 is a piston engine cylinder that houses the compression piston 03, the intake valve 10 and an interstage valve 12. The power cylinder 02 is a piston engine cylinder that houses the power piston 04, the exhaust valve 11, and part of the interstage valve 12. The power cylinder 02 further comprises an inner cylinder 02a and an outer cylinder 02b. The power piston 04 further comprises a dual-head piston further comprising a disc-shaped inner piston 04a and a ring-shaped outer piston 04b. The power cylinder 02 also includes: a compressed air valve 16 located within the outer power cylinder 02b and extending to the compression cylinder 01, a steam/air exhaust valve 13 located within the outer power cylinder 02b, an outer exhaust shell comprising a wrapped exhaust pipe 14, and a heat isolation layer 15. In one embodiment, the power cylinders 02, 02a and 02b are manufactured using highly conductive materials for further heat energy utilization.

In one preferred embodiment, the compression piston 03 serves for the intake and the compression engine strokes. The inner power piston 04a serves for the fuel combustion power and the exhaust (burned gaseous) strokes. The outer power piston 04b produces additional power and at the same time serves to cool chamber c and power piston 04a by the absorption of engine excessive heat, utilizing hot compressed air with or without steam/water. The connecting rods 05 and 06 connect the compression piston 03 and both power pistons 04a and 04b to their respective crankshafts 07 and 08. The compression crankshaft 07 converts rotational movement into compression piston 03 reciprocating movement. The power crankshaft 08 converts inner and outer power pistons 04a and 04b reciprocating movement into engine rotational output movement. The crankshaft connecting rod 09 transfers the power crankshaft 08 rotation into compression crankshaft 07 rotation. The engine intake valve 10 is composed of a shaft having a conic shaped sealing surface, the same as is used in most four stroke engines. The exhaust valve 11 is composed of a shaft having a conic shaped sealing surface, that same as is used in most four stroke engines. The interstage valve 12 is composed of a shaft having a conic shaped sealing surface.

Figure 29:
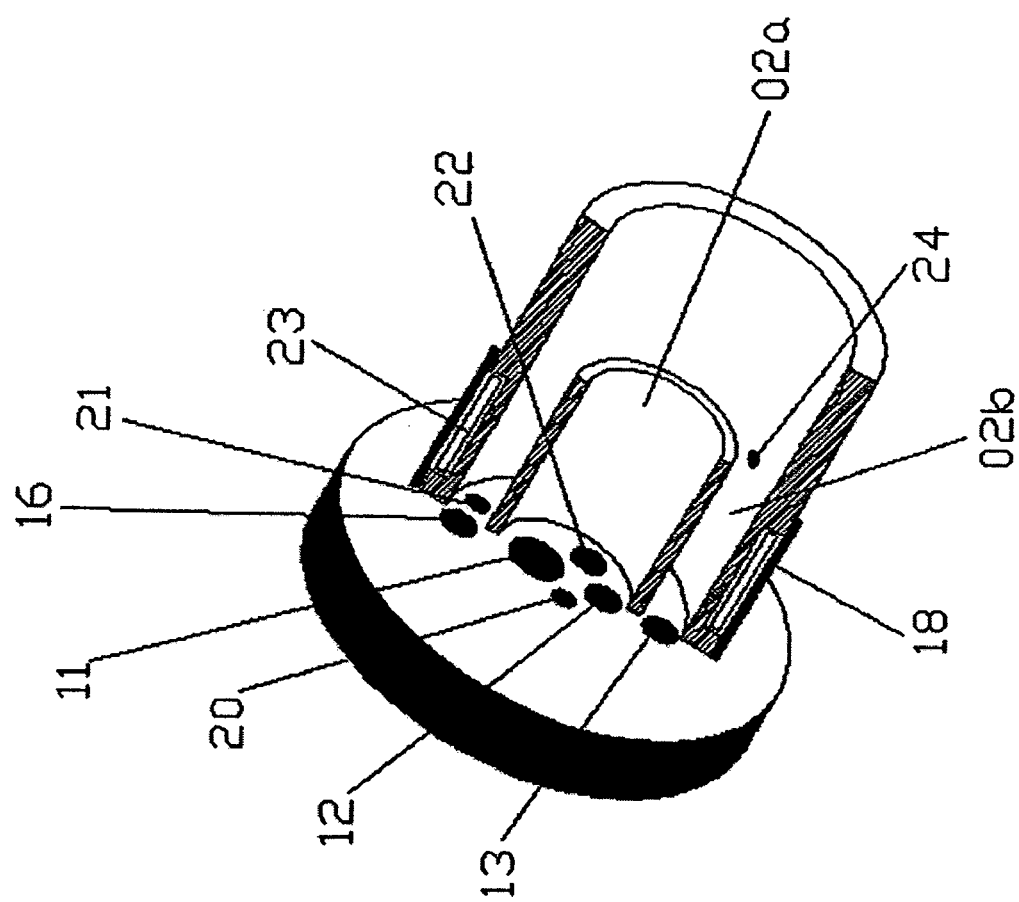
FIG. 29 is a 3D simplified cross-sectional view of inner and outer power cylinders, in accordance with one embodiment of the invention.

FIG. 29 illustrates a cross-sectional, perspective view of the power cylinder 02: a spark plug 22 located within the inner cylinder 02a, a fuel injection nozzle 20 located within the inner cylinder 02a, and a water/steam injection nozzle/valve 21 located in the outer cylinder 02b. In further embodiments, the SE-DPCE apparatus can additionally utilize electrical starters, pressurized oil lubrication systems, controlled water/steam systems to control water quantity, pressure and temperature, well-known high voltage timing and spark plug electrical systems, and output shaft flywheels. A combustion exhaust valve 11 includes a shaft having a conic shaped sealing surface, same as in most four stroke engines. When open, the valve 11 enables burned hot gaseous to exit the combustion chamber and stream into the exhaust wrapped shell 14. An interstage valve 12 is composed of a shaft having a conic shaped sealing surface. When open the interstage valve 12 enables compressed charge (fuel air mixture) to be pushed from the compression chamber into the combustion chamber. The steam/water outlet valve 13 is configured to open and close mechanically. When open the valve 13 enables the expanded steam water mixture to be pushed out by power piston 4b and be exhaled from the secondary power chamber E back into a supply water closed-loop system (not shown) or totally out of the engine The power cylinder 02 further includes a compressed air connecting valve 16, which is also configured to open and close mechanically. When open the valve 16 enables compressed hot air to be pushed from the engine compression chamber into the secondary power chamber E. A thermal isolation layer 15 is an external thermal isolation shield that prevents heat energy escape. By utilizing this shield 15 most of the engine excessive heat is forced to stay within the engine inner structure and thus to be converted by the secondary power chamber E into additional useful work. A fuel injection nozzle 20 is a mechanically operated valve that includes a fuel spray nozzle. In one embodiment, a direct pressurized fuel injection system, operated through predetermined engine cycle time band, pushes fuel into the combustion chamber. Using this system is an alternative to a common carburetor fuel supply system in which the fuel is sprayed in advance into either, the engine incoming air supply or during the engine compression stroke.

The power cylinder 02 further includes a water injection valve 21 configured to open and close mechanically and further including a water spraying nozzle. A pressurized water injection system, operated through a predetermined engine cycle time band, pushes water into the secondary power chamber E. The water is vaporized into compressed hot steam and thus produces elevated pressures and at the same time cooling cylinder 2*a*. A spark plug 22 is used to initiate fuel air compressed mixture explosions. Finally, FIG. 29 illustrates a cross-sectional view of an exhaust passage 23 that is wrapped around the secondary power cylinder perimeter in order to maintain and provide additional heat to the power cylinder.

Referring again to FIG. 28, when both the compression piston 03 and the power pistons 04 are at their TDC positions, the available volume in chamber B of cylinder 01 is minimized. At TDC, cylinder 02*a* and 02*b* also have minimized volumes in their respective contained chambers C and E. In one embodiment, the power crankshaft 08 rotates clockwise and causes the connecting rod 09 to move and rotate the compression crankshaft 07 clockwise. The rotation of crankshafts 07 and 08 actuates both pistons 03 and 04 to perform a symmetrical synchronous reciprocating movement in which the compression piston 03 and the power piston 04 moves inboard and outboard symmetrically in an equally paced manner. In alternative embodiments according to the present invention, a phase lag or phase advance between the relative location of the compression piston 03 and either the inner power piston 04*a* or outer power piston 04*b*, or both, may be introduced.

In one embodiment according to the present invention, the SE-DPCE cycle begins as compression piston passes through its TDC and the intake valve 10 opens. Ambient air flows into compression cylinder 01 chamber B. The compression crankshaft 07 rotates and the compression piston 03 moves until it reaches BDC, at which point the intake valve 10 closes. The compression piston 03 then performs its reciprocal movement back toward TDC causing the air pressure and temperature within chamber B to increase. At various predetermined points, one or both of the interstage valve 12 and the connecting valve 16 open. The connecting valve 16 allows compressed air to be pushed from the relatively high pressure chamber B into the then lower pressure combustion chamber C and into the ring shaped air/water/steam chamber E. In one embodiment, the compressed air is substantially transferred to the power cylinder 02 when the compression piston 03 and power piston 04 reach their TDC. Around the time the compressed air is finished being transferred to the power cylinder 02, the interstage valve 12 and compressed air valve 16 close. Fuel is injected into chamber C through fuel injection nozzle 20 and temperature-controlled water is sprayed and/or injected into chamber E via a water injection valve 21 (FIG. 29), respectively. The temperature-controlled water may be added into chamber E before, during, or after the valves 12 and 16 have finished closing. Spark plug 22 (FIG. 29) fires, causing combustion to occur, which forcefully pushes the inner power piston 04*a* toward its BDC. Simultaneously, the injected water and compressed air within chamber E expand and evaporate into steam which in turn dramatically increases pressure in chamber E. This increased pressure forcefully pushes the outer power piston 04*b* toward BDC. During the water to steam conversion (phase change), the engine excessive heat produced during combustion in chamber C is efficiently and productively removed to chamber E.

The SE-DPCE cycle ends as power piston 04 begins moving back towards TDC. At the same time, the exhaust valve 11 opens, the high temperature combustion products are directed from exhaust valve 11 into a port 19 and then pushed within a pipe wrapped around the outer cylinder 02*b* and exhaled out through area D, thereby heating the cylinder 02*b*. At or near the same time the exhaust valve 11 opens, the steam outlet valve 13 opens and the previously extract products (steam, water, air) of chamber E are recycled into the supply water close-loop system. In one embodiment, the steam outlet valve 13 opens and the previously extracted products (e.g., steam, water, air) of chamber E are drained or expelled out of the engine without recycling any water or steam for further energy generation. In alternative embodiments, in order to save energy, water and/or steam is recycled and the recycled liquids in chamber E can be used to pre-heat the incoming injected water. Before power piston 04 reaches TDC, the exhaust valve 11 and steam outlet valve 13 close again. A new cycle begins as the compression piston 03 retreats toward its BDC, and the intake valve 10 re-opens. In one embodiment, the external power cylinder 02 outer circumference is covered by a thermal isolation material layer 15, in order to minimize SE-DPCE heat energy losses.

Figure 30:
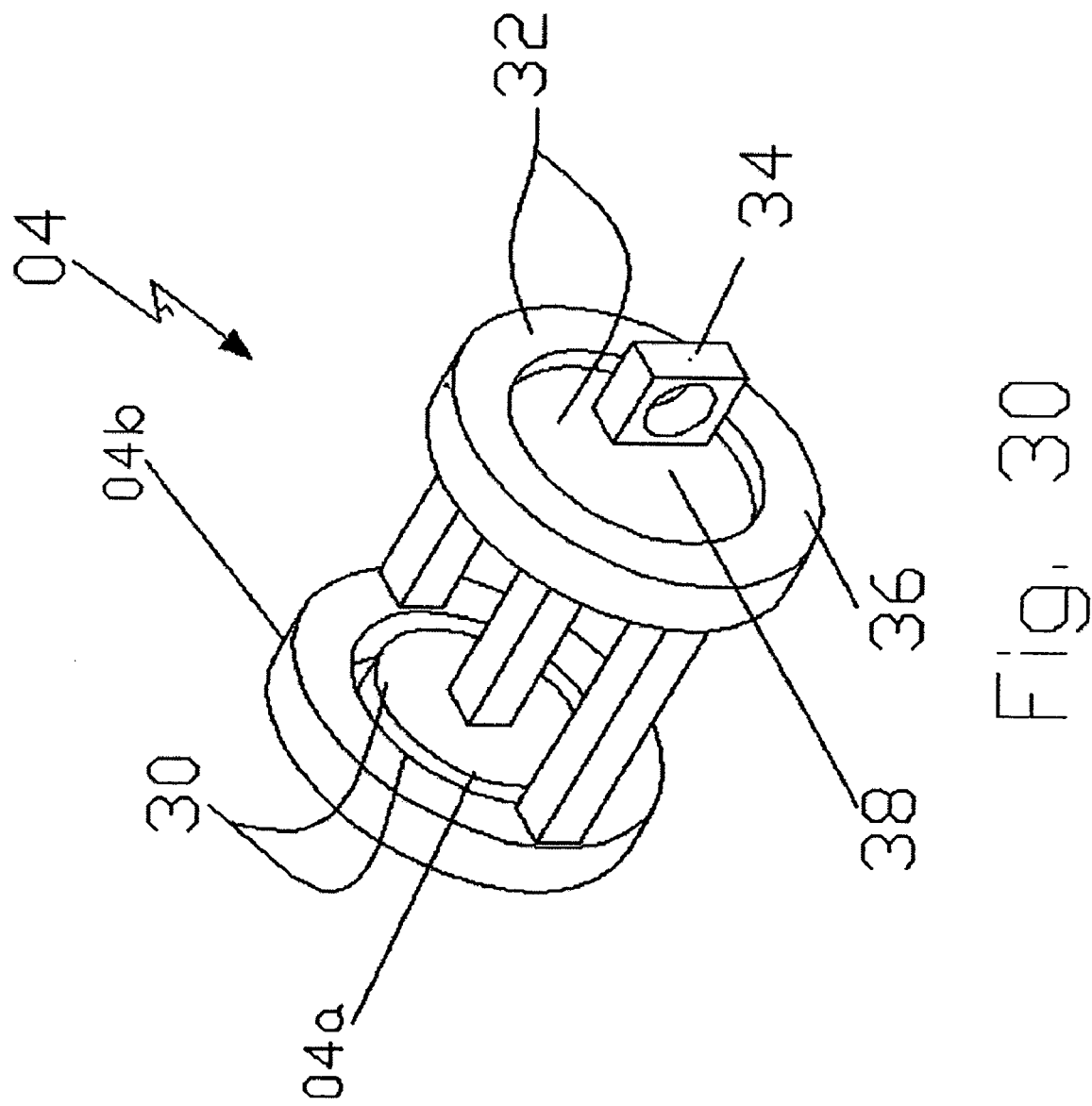
FIG. 30 is a 3D simplified illustration of a power piston further containing inner and outer pistons, in accordance with one embodiment of the invention.

In one embodiment, as shown in FIG. 30, piston 04 includes a hot section 30, which is adjacent to and/or in direct contact with the combustion product and hotter cylinder surfaces. The hot section 30 is made out of temperature resistance materials like carbon or ceramic. This piston section carries only longitudinal forces. A secondary sliding disk 36 receives most of the sliding side friction forces. Section 30 is the hot part of piston 04, and it is cooled and lubricated utilizing a small amount of water and steam leakages. Section 32 is the colder part of piston 04 and it is further cooled and lubricated utilizing well known piston engine lubrication methods. A disk 38 separates the oil lubricated colder section 32 from the hotter piston steam lubricated section 30. A power connecting rod 06 connects a piston ear 34 to the power crankshaft 08.

Figure 31:
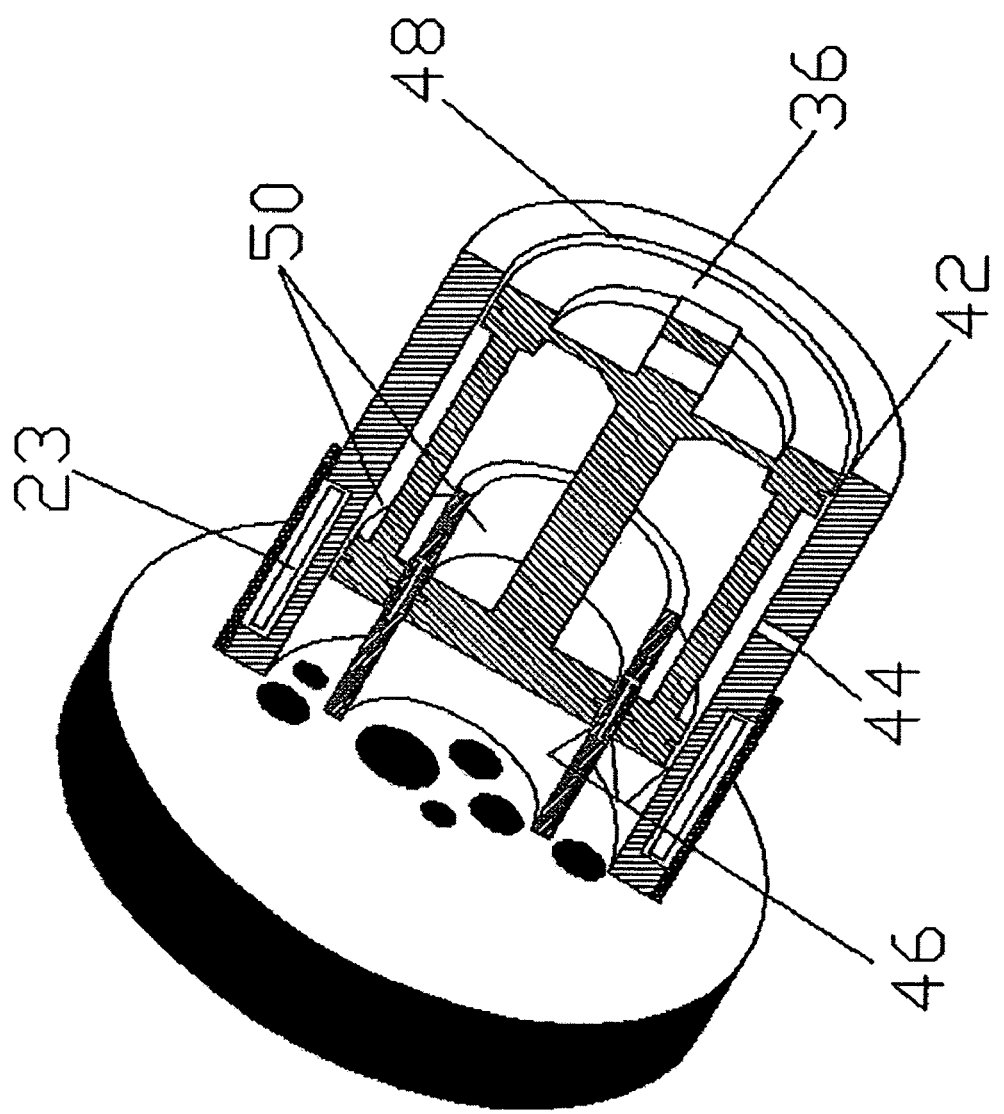
FIG. 31 is a 3D simplified cross-sectional view of inner and outer power cylinders and corresponding inner and outer power pistons, in accordance with one embodiment of the invention.

FIG. 31 illustrates construction and lubrication of the power piston 04 in accordance with one aspect of the present invention. In one embodiment, the power cylinder 02 and pistons 04, 04*a* and 04*b* surfaces that are directly engaged with the combustion process are enforced with ceramic. The ceramic surfaces of the power cylinder 02 and pistons 04, 04*a*, and 04*b* are water/steam cooled and lubricated. As the outer power piston 04*b* approaches BDC a small amount of steam is released through nozzles into the area in between the power piston 04 and inner and outer power pistons 04*a* and 04*b*. The hot piston portion side forces are absorbed by an additional piston sliding disc 36, which carries most of the piston side stresses and is oil-lubricated using well-known methods. The piston sliding disc 36 separates and seals the area around the crankshaft 08 from the rest of the area within the power cylinder 02. Thus, by utilizing innovative cooling and lubrication aspects of the present invention, the SE-DPCE can operate under higher temperatures.

The oil separation disc 36 takes most of piston 04 side sliding friction forces, during engine crankshafts rotation, machine oil is allowed to flow toward cylinder surface 48 (between cylinder 02 and piston 04). In one embodiment, engine common seal rings 42 may be installed around the perimeter of disc 36. Piston and cylinder sliding surfaces 46 and 50 utilize water and steam as cooling and lubrication liquids, those substance are than drained out of cylinder 02 through drain port 44.

Figure 32:
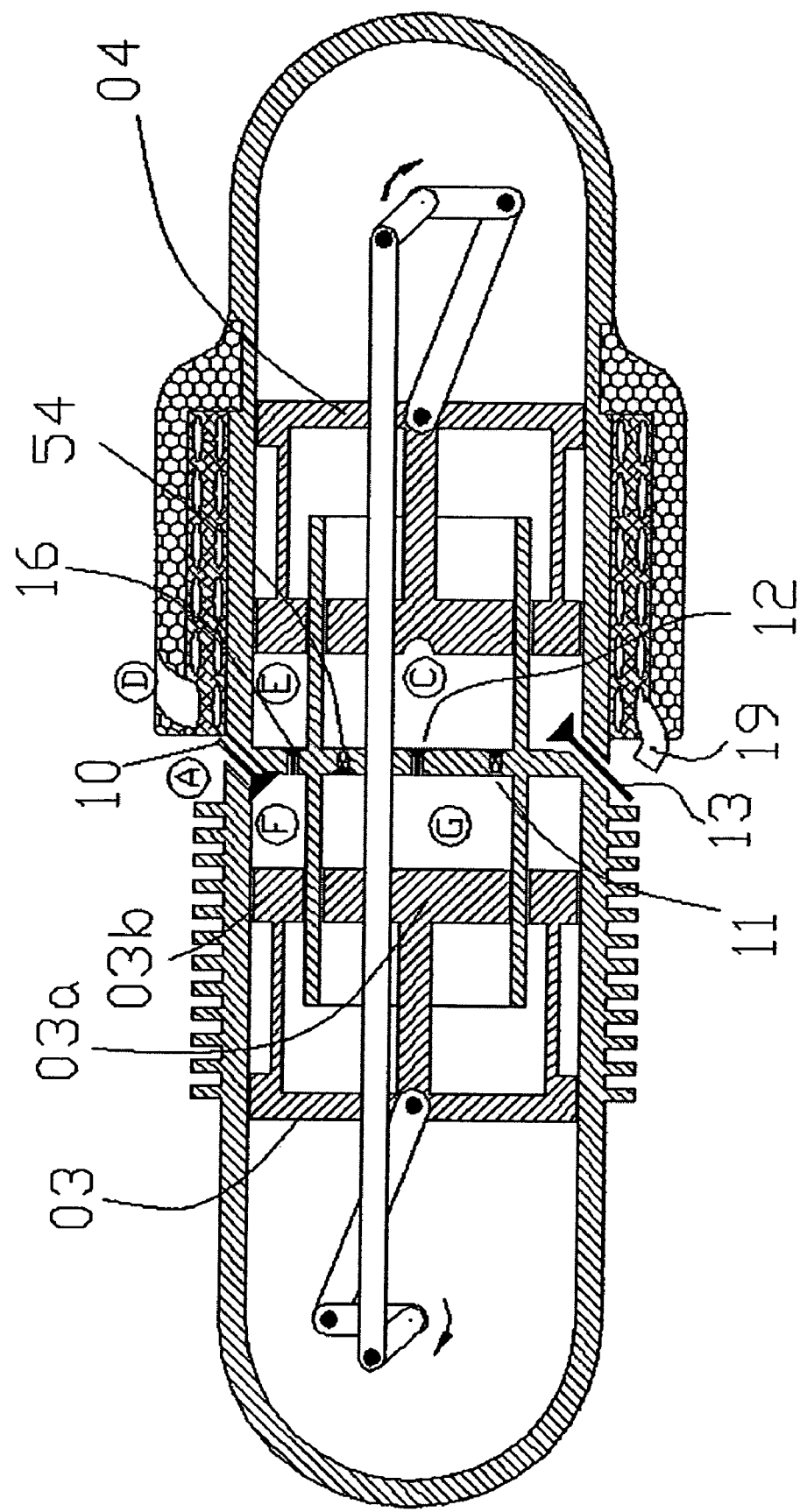
FIG. 32 is a simplified cross-sectional side view of a SE-DPCE apparatus having two separate compression pistons, in accordance with one embodiment of the invention, wherein one piston serves the combustion process and the other piston serves the water/steam chamber.

FIG. 32 illustrates another embodiment according to the present invention wherein the SE-DPCE comprises a split compression piston 03. The compression piston 03 is divided into an inner compression piston 03a and an outer compression piston 03b. The inner compression piston 03a sucks ambient air, with or without carbureted fuel, through an intake valve 54 and compresses it through the interstage valve 12 into the combustion chamber C. The outer compression piston 03b that sucks ambient air through an intake valve 10 and compresses it through a connecting intake valve 16 into air-steam chamber E. In one embodiment, water is also added into the intake air chamber F and then compressed through connecting intake valve 16 into chamber E, or alternatively, water can be injected directly into chamber E via water injection nozzle 21 (FIG. 29). A split compression piston configuration enables the engine to make use of carbureted fuel that is sucked into chamber G. In addition, the split compression piston and chamber configuration enables the SE-DPCE to be designed such that the total incoming air is volumetric divided between chambers F and G and the volume of each chamber F and G can be independently determined.

Figure 33:
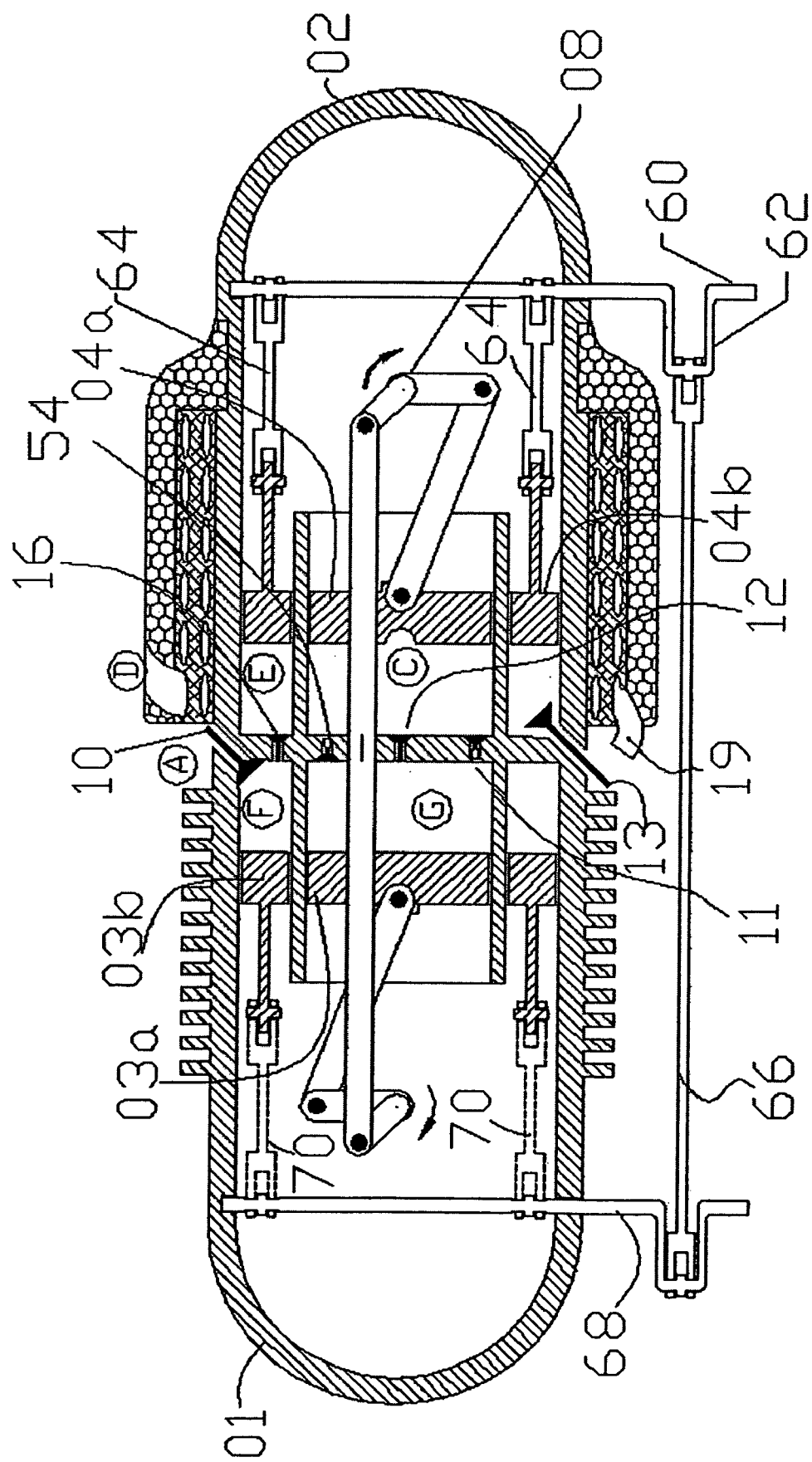
FIG. 33 is a simplified cross-sectional side view of a SE-DPCE apparatus utilizing two separate output shafts, in accordance with one embodiment of the invention, wherein the combustion process section is disengaged from the steam enhanced section.

FIG. 33 illustrates another embodiment according to the present invention wherein the SE-DPCE comprises two separate power producers in which a primary combustion system utilizes the fuel-air combustion process, while a secondary water-steam-air system utilizes excess engine heat. In this embodiment, the primary combustion system comprises a compression piston 03a, a power piston 04a, an intake valve 54, an exhaust valve 11, an interstage valve 12 and an output shaft 08. In one embodiment, the exhaust from exhaust valve 11 is input into the cylinder heating port 19 to heat cylinder 02b, as described above. The secondary water-steam-air system comprises a compression piston 03b, a power piston 04b, an intake valve 10, an interstage valve 16, a steam/air exhaust valve 13 and a secondary power output shaft 60. The primary combustion system converts fuel and air into engine work as describe above. The secondary water-steam-air system in one embodiment utilizes substantially identical piston reciprocal movement, connecting rod motion and crankshaft rotation to the primary combustion system. However, in the secondary water-steam-air system, heated air, water, and/or steam can be used to produce engine work. Each power producing system actuates its own operating valves. The primary combustion system actuates valves 54, 12 and 11, as well as an optional fuel injection system in one embodiment. In this embodiment, the secondary system actuates valves 16 and 13 and optionally the water chamber E direct injection system (nozzle 24, FIG. 29). In accordance with the discussions above, in some embodiments, the primary compression piston 03a and primary power piston 04a are configured to operate with a phase difference such that they reach their TDC positions at different times. Similarly, the secondary compression piston 03b and secondary power piston 04b can also be configured to operate with a phase difference with respect to one another.

In one embodiment, the SE-DPCE makes use of the following dynamic parts, which serve the secondary power output (the compression and power pistons movements which utilizes engine heat for additional engine power output). The secondary power output includes two pistons, comprising a ring compression piston 03b and a ring output piston 04b, two compression connecting rods 70, a compression crankshaft 68, a power crankshaft 60, a power crankshaft connecting rods 64 and crankshaft connecting rod 66. The connecting rods connect respective pistons to their respective crankshafts. The compression crankshaft 68 converts rotational movement into reciprocating movement of the compression ring piston 03b. The output power crankshaft 60 converts output power ring piston 04b reciprocating movement into secondary output 60 rotational movement. The crankshaft connecting rod 66 transfers the output power crankshaft 60 rotation using crankshaft 62 into compression crankshaft 68 rotation.

In one embodiment, there is no engine internal engagement between the primary and secondary shafts 08 and 60. In this embodiment, each system is independent, with the power and speed of each shaft depending on engine working condition and engine input parameters. In an additional embodiment, the SE-DPCE is capable of accepting a carbureted fuel/air charge as well as performing a fuel injection method of combustion. And, in yet another embodiment, the SE-DPCE is capable of accepting air and water as well as air followed by injected water directly sprayed into chamber E. In another embodiment according to the present invention, the SE-DPCE utilizes an electronic optimization management computer (not shown) which monitors engine temperature, RPM, engine torque, fuel consumption, injected water temperature, and injected water quantity. The computer analyzes these various engine physical parameters accordingly adjusts the injected water quantities, temperatures and injected fuel quantities for best performance.

In various other embodiments according to the present invention, the SE-DPCE may have any of several additional features. In one embodiment, the water-steam chamber E operates with water and/or steam instead of compressed air. As piston reaches TDC, water and/or steam are injected into chamber E. Combustion piston 03 transfers compressed air only through interstage valve 12 into chamber C. The water cooling and work producing functions describe above are performed with injected water into chamber E and the accompanying phase change into steam. During piston retraction, as the piston moves toward TDC, chamber E steam and/or water is exhaled through the steam/air exhaust valve 13. In an additional embodiment, the steam may be heated to a higher temperature for better engine performance.

In another alternative embodiment either water and/or steam may be replaced with another liquid or gas such as Ammonia, Freon, Ethanol or any other suitable expandable liquids (include gaseous).

In a further embodiment, compressed air alone, and not water or steam, is injected into chamber E.

In another embodiment, a boiler layer 71 comprises a plurality of passages 71 for holding fluids and/or gases therein, wherein the boiler layer 71 is wrapped around at least a portion of the combustion chamber housing 02. As shown in FIG. 34, in one embodiment, the boiler layer/passages 71 are surrounded by the passages 14 of the wrapped exhaust pipe 14, both of which are surrounded by heat isolation/insulation layer 15. It is understood that the cross-sectional views of passages 71 and 14 are illustrated as square and circular shapes, respectively. for purposes of illustration only. In actual implementations, any desired shape may be utilized for these passages. In alternative embodiments the passages 71 and/or passages 14 may each be configured as a single larger passage or channel for holding fluids and/or gases therein that is wrapped around the combustion chamber housing. In one embodiments, pressurized water or other suitable fluid from an external source (not shown) is pushed by a hydraulic pump (not shown) into the boiler passages 71 via an inlet port 72. Since combustion chamber C, cylinder 02 and the inner wrapped exhaust layer 14 temperature are very high, any water (or any other liquid) flowing or injected into the inlet port 72 will rapidly turn into high pressure steam. In one embodiment, the high pressure steam is then directed from steam output port 74 toward an external steam piston engine (not shown) or steam turbine (not shown), which converts the steam energy into additional useful mechanical work, such as turning an electrical generator or mechanically engaging the SE-DPCE main output shaft 08. The isolation layer 15 keeps most of SE-DPCE heat energy within the engine structure. As power piston 04 begins its exhaust stroke hot combustion gases flows through exhaust valve 11 into inlet exhaust wrap port 19, thereby heating the inner wrapped exhaust layer 14. After transferring part of their heat energy into the water/steam wrap tube 14, the exhaust gases are exhaled from the engine through output port D.

By implementing the above-described method and apparatus, the SE-DPCE embodiment creates and utilizes steam energy by using previously unused thermal energy. The generated steam energy is then used to produce additional mechanical work. In one embodiment, the steam energy is utilized by an auxiliary steam engine or steam turbine, which then converts the steam energy to additional work.

Other embodiments in which engine intake and compression pistons are physically separated from combustion and exhaust high temperature influence are possible as well, as would be apparent to one of skill in the art upon reviewing this description. While various embodiments of the invention have been illustrated and described, those of ordinary skill in the art will appreciate that the above descriptions of the embodiments are exemplary only and that the invention may be practiced with modifications or variations of the devices and techniques disclosed above. Those of ordinary skill in the art will know, or be able to ascertain using no more than routine experimentation, many equivalents to the specific embodiments of the invention described herein. Such modifications, variations, and equivalents are contemplated to be within the spirit and scope of the present invention as set forth in the claims below.

What is claimed is:

1. A dual piston apparatus for use in a combustion engine, comprising:
    a first cylinder housing a first piston therein, wherein the first piston performs only intake and compression strokes;
    a second cylinder housing a second piston therein, wherein the second piston performs only power and exhaust strokes; and
    a third piston also contained in the second cylinder and coupled to the second piston, wherein the third piston utilizes heat energy generated by the second piston to perform additional power strokes.

2. The apparatus of claim 1 wherein:
    the second piston comprises a disc-shaped inner combustion piston comprising a lateral cylindrical surface and forming a first internal chamber within the second cylinder; and
    the third piston comprises a ring-shaped outer power piston surrounding the lateral cylindrical surface of the second piston and forming a second internal chamber within the second cylinder, wherein the second internal chamber at least partially surrounds the first internal chamber.

3. The apparatus of claim 1 wherein the first cylinder is thermally isolated from the second cylinder and the first cylinder is maintained at a cooler temperature than the second cylinder during operation.

4. The apparatus of claim 1 further comprising:
    an intake valve coupled to the first cylinder for allowing a fuel mixture to enter into the first cylinder;
    a combustion exhaust valve coupled to said first internal chamber of the second cylinder for allowing an exhaust gas to exit the second cylinder; and
    an interstage valve that couples an internal chamber of the first cylinder to said first internal chamber of the second cylinder.

5. The apparatus of claim 1 further comprising:
    an intake valve coupled to the first cylinder for allowing a fuel mixture to enter into the first cylinder;
    a connecting valve that couples an internal chamber of the first cylinder to said second internal chamber of the second cylinder, wherein said connecting valve transfers compressed air, liquid or gas to said second internal chamber of the second cylinder; and
    an outlet valve coupled to said second internal chamber of the second cylinder for allowing a volume of air, liquid or gas to exit the second internal chamber of the second cylinder.

6. The apparatus of claim 5 further comprising an injection nozzle coupled to said second internal chamber of the second cylinder for injecting a liquid or gas into said second internal chamber of the second cylinder.

7. The apparatus of claim 1 further comprising:
    an intake valve coupled to the first cylinder for allowing a fuel mixture to enter into the first cylinder;
    an injection nozzle coupled to said second internal chamber of the second cylinder for injecting a liquid or gas into said second internal chamber of the second cylinder; and
    an outlet valve coupled to said second internal chamber of the second cylinder for allowing liquid or gas to exit the second internal chamber of the second cylinder.

8. The apparatus of claim 7, wherein said liquid or gas comprises water or steam, respectively.

9. The apparatus of claim 8, wherein said injected liquid or gas comprises at least one of water, steam, ammonia, Freon or Ethanol.

10. The apparatus of claim 1 further comprising an outer exhaust shell positioned on the exterior surface of said second cylinder housing, wherein the outer exhaust shell is configured to maintain the second cylinder at an elevated temperature.

11. The apparatus of claim 10, wherein said outer exhaust shell comprises:
    a thermal isolation layer; and
    a wrapped exhaust pipe, wherein said wrapped exhaust pipe is wrapped around the exterior surface of said second cylinder housing and further comprises a plurality of exhaust heating passages for utilizing heat provided by exhaust gases expelled by the second piston to further heat the second cylinder.

12. The apparatus of claim 11 further comprising:
a boiler layer wrapped around the exterior surface of the second cylinder housing, underneath the wrapped exhaust pipe; and
an inlet port coupled to the boiler layer for allowing a fluid to enter the boiler layer, where in the fluid is converted to a gas due to the elevated temperature.

13. The apparatus of claim 1 further comprising a boiler layer coupled to a housing of the second cylinder for converting a fluid into a gas due to an elevated temperature of the second cylinder housing.

14. A dual piston apparatus for use in a combustion engine, comprising:
a first cylinder housing a first piston therein, wherein the first piston performs only intake and compression strokes, wherein the first piston comprises:
 a disc-shaped inner compression piston forming an inner internal chamber of the first cylinder;
 a ring-shaped outer compression piston, coupled to and surrounding the disc-shaped inner compression piston, wherein said outer compression piston forms an outer internal chamber of the first cylinder; and
a second cylinder housing a second piston therein, wherein the second piston performs only power and exhaust strokes.

15. The apparatus of claim 14, wherein the second piston comprises:
a disc-shaped inner combustion piston forming an inner internal chamber of the second cylinder; and
a ring-shaped outer power piston, coupled to and surrounding the disc-shaped inner combustion piston wherein said outer power piston forms an outer internal chamber of the second cylinder.

16. The apparatus of claim 15 further comprising:
an intake valve coupled to the first cylinder for allowing a fuel mixture to enter into the first cylinder;
a combustion exhaust valve coupled to said inner internal chamber of the second cylinder for allowing an exhaust gas to exit the second cylinder; and
an interstage valve that couples said inner internal chamber of the first cylinder to said inner internal chamber of the second cylinder.

17. The apparatus of claim 15 further comprising:
an intake valve coupled to the first cylinder for allowing a fuel mixture to enter into the first cylinder;
a connecting valve that couples said outer internal chamber of the first cylinder to said outer internal chamber of the second cylinder, wherein said connecting valve transfers a volume comprising at least one of a gas or a liquid to said outer internal chamber of the second cylinder; and
an outlet valve coupled to said outer internal chamber of the second cylinder for allowing a volume of gas to exit the outer internal chamber of the second cylinder.

18. The apparatus of claim 15, wherein the volume of said outer internal chamber of the first cylinder is different than the volume of said inner internal chamber of the first cylinder.

19. The apparatus of claim 14 further comprising a boiler layer coupled to the second cylinder housing for converting a fluid into a gas due to an elevated temperature of the second cylinder housing.

20. A dual piston apparatus for use in a combustion engine, comprising:
a first cylinder housing a disc-shaped inner compression piston and a ring-shaped outer compression piston, wherein said inner and outer compression pistons perform only intake and compression strokes and wherein said inner compression piston forms an inner internal chamber of the first cylinder and said outer compression piston forms an outer internal chamber of the first cylinder; and
a second cylinder housing a disc-shaped inner combustion piston and a ring-shaped outer power piston, wherein said inner combustion piston and outer power piston perform only power and exhaust strokes and wherein said inner combustion piston forms a first internal chamber of the second cylinder and said outer power piston forms a second internal chamber of the second cylinder.

21. The apparatus of claim 20 further comprising:
a first primary crankshaft coupled to the inner compression piston;
a second primary crankshaft coupled to the inner combustion piston; and
a primary crankshaft connecting mechanism coupled to the first and second primary crankshafts and configured to translate motion between the first and second primary crankshafts.

22. The apparatus of claim 21 further comprising:
a first secondary crankshaft coupled to the outer compression piston;
a second secondary crankshaft coupled to the outer power piston; and
a secondary crankshaft connecting mechanism coupled to the first and second secondary crankshafts and configured to translate motion between the first and second secondary crankshafts.

23. The apparatus of claim 22 wherein the second secondary crankshaft moves at a different rate than the second primary crankshaft.

24. The apparatus of claim 22 wherein the first and second secondary crankshafts are configured to provide a phase difference between the outer compression piston and the outer power piston.

25. The apparatus of claim 21 wherein the first and second primary crankshafts are configured to provide a phase difference between the inner compression piston and the inner combustion piston.

26. The apparatus of claim 20 further comprising a boiler layer coupled to the second cylinder housing for converting a fluid into a gas due to an elevated temperature of the second cylinder housing.

* * * * *